US011718806B2

United States Patent
Hill, Jr. et al.

(10) Patent No.: US 11,718,806 B2
(45) Date of Patent: Aug. 8, 2023

(54) TRANSFORMER OIL BASESTOCK AND TRANSFORMER OIL COMPOSITION COMPRISING THE SAME

(71) Applicant: ExxonMobil Chemical Patents Inc., Baytown, TX (US)

(72) Inventors: Ronald R. Hill, Jr., Humble, TX (US); Caterina T. H. Tran, Houston, TX (US); Andrew P. Broenen, Houston, TX (US); Shaival R. Mehta, Katy, TX (US); Daniel X. Bien, Brussels (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/641,893

(22) PCT Filed: Sep. 10, 2018

(86) PCT No.: PCT/US2018/050182
§ 371 (c)(1),
(2) Date: Feb. 25, 2020

(87) PCT Pub. No.: WO2019/051363
PCT Pub. Date: Mar. 14, 2019

(65) Prior Publication Data
US 2020/0199474 A1    Jun. 25, 2020

Related U.S. Application Data

(60) Provisional application No. 62/556,571, filed on Sep. 11, 2017.

(30) Foreign Application Priority Data

Mar. 9, 2018    (EP) .................................. 18160969

(51) Int. Cl.
*C10M 101/02* (2006.01)
*C10M 169/04* (2006.01)
(Continued)

(52) U.S. Cl.
CPC ............. *C10M 101/02* (2013.01); *C09D 7/63* (2018.01); *C09D 11/36* (2013.01); *C09J 11/06* (2013.01);
(Continued)

(58) Field of Classification Search
CPC ............. C10M 101/02; C10M 169/04; C10M 2203/104; C10M 2203/1045;
(Continued)

(56) References Cited

U.S. PATENT DOCUMENTS 4,228,023 A * 10/1980 Schulz .................... H01B 3/22
585/6.3
5,055,162 A    10/1991 Brown et al.
(Continued)

FOREIGN PATENT DOCUMENTS

| WO | 2007/027782 A1 | 3/2007 |
| WO | 2019/051363 A1 | 3/2019 |
| WO | 2019/051391 A1 | 3/2019 |

*Primary Examiner* — Latosha Hines
(74) *Attorney, Agent, or Firm* — ExxonMobil Technology and Engineering Company—Chemicals

(57) ABSTRACT

A transformer oil basestock is disclosed that includes at least 99 wt % of naphthenes and paraffins, based on the total weight of the transformer oil basestock, wherein the weight ratio of naphthenes to paraffins is at least 1, as measured by GC-MS, and wherein the paraffins consist essentially of isoparaffins, as determined by GC-FID. In addition, a transformer oil composition is disclosed that includes the transformer oil basestock, an anti-gassing agent and an antioxidant.

20 Claims, 6 Drawing Sheets

(51) Int. Cl.

| | | |
|---|---|---|
| *C09D 7/63* | (2018.01) | |
| *C09D 11/36* | (2014.01) | |
| *C09J 11/06* | (2006.01) | |
| *C09K 5/10* | (2006.01) | |
| *C09K 8/035* | (2006.01) | |
| *C10G 5/00* | (2006.01) | |
| *C10N 20/00* | (2006.01) | |
| *C10N 30/00* | (2006.01) | |
| *C10N 30/02* | (2006.01) | |
| *C10N 30/10* | (2006.01) | |
| *C10N 30/14* | (2006.01) | |
| *C10N 30/16* | (2006.01) | |
| *C10N 40/14* | (2006.01) | |

(52) U.S. Cl.
CPC ............ *C09K 5/10* (2013.01); *C09K 8/035* (2013.01); *C10G 5/00* (2013.01); *C10M 169/04* (2013.01); *C10G 2300/1074* (2013.01); *C10G 2300/301* (2013.01); *C10G 2300/302* (2013.01); *C10G 2300/304* (2013.01); *C10G 2300/308* (2013.01); *C10G 2400/30* (2013.01); *C10M 2203/1045* (2013.01); *C10M 2203/1065* (2013.01); *C10M 2203/1085* (2013.01); *C10M 2207/023* (2013.01); *C10N 2020/015* (2020.05); *C10N 2020/017* (2020.05); *C10N 2030/02* (2013.01); *C10N 2030/10* (2013.01); *C10N 2030/14* (2013.01); *C10N 2030/16* (2013.01); *C10N 2030/28* (2020.05); *C10N 2040/14* (2013.01)

(58) Field of Classification Search
CPC .... C10M 2215/064; C10M 2203/1085; C10M 2203/1065; C10M 2205/22; C10M 2207/023; C10M 2207/026; C10M 2207/289; C10M 101/024; C10N 2020/015; C10N 2020/017; C10N 2020/02; C10N 2020/071; C10N 2030/02; C10N 2030/08; C10N 2030/10; C10N 2030/14; C10N 2030/16; C10N 2030/18; C10N 2030/28; C10N 2030/40; C10N 2030/70; C10N 2040/08; C10N 2040/14; C10N 2040/16; C10N 2020/011; C10N 2070/00; C09D 11/36; C09D 7/63; C09K 5/10; C09K 8/035; C10G 2300/1074; C10G 2300/301; C10G 2300/302; C10G 2300/304; C10G 2300/308; C10G 2400/30; C10G 5/00; C09J 11/06
See application file for complete search history.

(56) References Cited

U.S. PATENT DOCUMENTS

| | | |
|---|---|---|
| 5,911,874 A | 6/1999 | Cody et al. |
| 6,096,189 A | 8/2000 | Cody et al. |
| 6,951,605 B2 | 10/2005 | Cody et al. |
| 8,298,451 B2 | 10/2012 | Sinclair et al. |
| 8,394,255 B2 | 3/2013 | McCarthy et al. |
| 8,617,383 B2 | 12/2013 | Prentice et al. |
| 8,992,764 B2 | 3/2015 | Prentice et al. |
| 9,309,472 B2 | 4/2016 | Vijay et al. |
| 9,394,494 B2 | 7/2016 | Joseck et al. |
| 9,587,184 B2 | 3/2017 | Joseck et al. |
| 2006/0100466 A1* | 5/2006 | Holmes ............... C10M 105/04 585/1 |
| 2006/0100467 A1* | 5/2006 | Holmes ............... H01B 3/22 508/110 |
| 2009/0001330 A1* | 1/2009 | Arickx ............... C10M 171/00 252/570 |
| 2009/0036337 A1* | 2/2009 | Deskin ............... H01B 3/22 508/279 |
| 2012/0205589 A1* | 8/2012 | Hansen ............... C10G 45/44 106/499 |
| 2017/0183576 A1 | 6/2017 | Hilbert et al. |
| 2017/0183577 A1 | 6/2017 | Hilbert et al. |
| 2017/0183578 A1* | 6/2017 | Hilbert ............... C10G 67/0418 |
| 2017/0306253 A1* | 10/2017 | Wrigley ............... C10L 1/04 |

\* cited by examiner

TRANSFORMER OIL BASESTOCK AND TRANSFORMER OIL COMPOSITION COMPRISING THE SAME

CROSS-REFERENCE OF RELATED APPLICATIONS

This application is a National Phase Application claiming priority to PCT Application Serial No. PCT/US2018/050182, filed Sep. 10, 2018, which claims the benefit of U.S. Provisional Application Ser. No. 62/556,571, filed 11 Sep. 2017, and European Patent Application Serial No. 18160969.4, filed 9 Mar. 2018.

TECHNICAL FIELD

The present disclosure generally relates to a transformer oil basestock. More particularly, the present disclosure further relates to a transformer oil composition comprising said transformer oil basestock, an anti-gassing agent, and an antioxidant, as well as to the use of said transformer oil basestock for the preparation of a transformer oil composition having an improved gassing tendency and/or an improved oxidation stability.

BACKGROUND

Transformer oil compositions are necessary in the transmission of electrical power. They are manufactured to provide extremely low electric conductivity, meaning they must have excellent electrical insulating properties, insulating the energized components of electrical equipment from the equipment enclosure and from other internal parts, and they also serve to suppress arcing and corona formation under operation of a transformer. Also, because transferring electricity generates heat, transformer oil compositions serve as coolant, dissipating the heat generated by energized components, meaning they must be stable at high temperature. Due to the high performance requirements, specifications were developed, including the ASTM (American Society for Testing and Materials) D3487-16 or IEC 60296. These performance standards include a maximal pour point, a maximal kinematic viscosity, and enumerated limits on gassing tendency, interfacial tension, corrosive sulfur, color, specific gravity, water content, dielectric breakdown, oxidation stability, aniline point, power factor, flash point, and neutralization number. In particular, because transformers typically operate at elevated temperatures for many years, transformer oil compositions must be stable for prolonged periods of time. Transformer oil compositions should also have high dielectric strength and low power factor to provide excellent insulating properties, as well as low gassing tendency, good oxidation stability, and excellent low-temperature properties.

Transformer oil compositions are thus useful in transformers but also in capacitors, tap changers, regulators, fuses, circuit breakers, switches and cables, and other oil-immersed electrical equipment.

To achieve these properties, transformer oil compositions typically contain a basestock (also referred to as transformer oil basestock) formulated with additives, such as anti-gassing agents, oxidation inhibitors, pour point depressants, corrosion inhibitors, metal passivators, and the like. Typical basestocks suitable for the preparation of transformer oil compositions include naphthenic basestocks derived from naphthenic crudes; paraffinic basestocks derived from at least one of hydrocracking, solvent dewaxing, catalytic dewaxing, distillation, solvent extraction, and hydrofining, and synthetic basestocks, such as poly-alpha olefins, gas-to-liquid (GTL) products, and synthetic esters, particularly polyol esters derived from fatty acids and alcohols; natural esters may also be used. Naphthenic basestocks are advantageous in that they have inherent low pour points but have the drawback of being sensitive to oxidation. Higher oxidation resistance can be achieved through the use of paraffinic basestocks, however, paraffinic basestocks have high gassing tendencies. Synthetic basestocks may have some advantageous properties, but these products are most often very expensive in comparison with conventional naphthenic and paraffinic basestocks. GTL basestocks have high gassing tendencies and relatively high viscosities. Synthetic esters may have high pour points, high densities, and high viscosities, and may also raise concerns in terms of stability.

WO 2007/027782 discloses blending a naphthenic base oil and a paraffinic base oil for the preparation of a mineral insulating oil that may be used as a dielectric fluid or transformer oil. If the gassing tendency of the mineral insulating oil is not 30 µL/min. or less, then an anti-gassing agent, in particular an anti-gassing aromatic that comprises at least one labile hydrogen atom, may be added to reduce it to 15 µL/min. or less, and more preferably 5 µL/min. or less.

US 2009/0001330 discloses the use of isomerized Fischer-Tropsch base oil in combination with additives such as anti-gassing agents for the preparation of transformer oils.

U.S. Pat. No. 8,298,451 B2 discloses the use of aromatic reformer distillates having a 1-ring and 2-ring aromatics content of at least 98% as gassing additives for transformer oils.

There still exists a need for transformer oil basestocks useful for the preparation of transformer oil compositions having improved properties, in particular in terms of oxidation stability and gassing tendency. The object of the embodiments disclosed herein is therefore to provide such a transformer oil basestock, in particular a transformer oil basestock that allows for the preparation of transformer oil compositions having improved oxidation stability and gassing tendency while showing acceptable low temperature properties.

BRIEF SUMMARY

In one aspect, at least some of the embodiments disclosed herein relate to a transformer oil basestock comprising at least 99 wt % of naphthenes and paraffins, wherein the weight ratio of naphthenes to paraffins is at least 1, as measured by GC-MS (Gas Chromatography-Mass Spectrometry), and wherein the paraffins consist essentially of isoparaffins, as determined by GC-FID (Gas Chromatography with Flame Ionization Detection).

In another aspect, at least some embodiments disclosed herein relate to a transformer oil composition comprising said transformer oil basestock, an anti-gassing agent, and an antioxidant.

In a further aspect, at least some embodiments disclosed herein relate to the use of said transformer oil basestock for preparing a transformer oil composition having an improved gassing tendency and/or an improved oxidation stability while showing acceptable low temperature properties.

In still another aspect, at least some embodiments disclosed herein relate to a process for the preparation of a transformer oil composition, comprising contacting the transformer oil basestock with an anti-gassing agent, an antioxidant, and potential other suitable additives.

In a still further aspect, at least some embodiments disclosed herein relate to the use of the transformer oil basestock in end-uses selected from the group consisting of AgChem (e.g. spray oils), high viscosity low pour point base oils for drilling muds, silicone oil extenders, acrylic and silicone mastics and sealants, adhesives, explosive formulations, printing inks (e.g. printing ink distillates for off-set printing, piezo ink jet technology, cold-set printing, and heat-set printing), diluent oils for lube additives, spindle oils, coolants (e.g. battery coolants, coolants for data storage, process coolant fluids), heat transfer fluids, electric vehicle fluids (e.g. coolant or heat transfer fluid for batteries, motors and/or electrical components), metal working fluids, plasticizers, mold oils, coning oils, dust control fluids, collector fluids in floatation processes such as mining floatation, mining extraction, metal extraction, process fluids, hydraulic oils, animal vaccines, paints and coatings, industrial and institutional cleaners, consumer products, lubricants, automotive lubricants, and transmission fluids.

DETAILED DESCRIPTION

Figure 1:
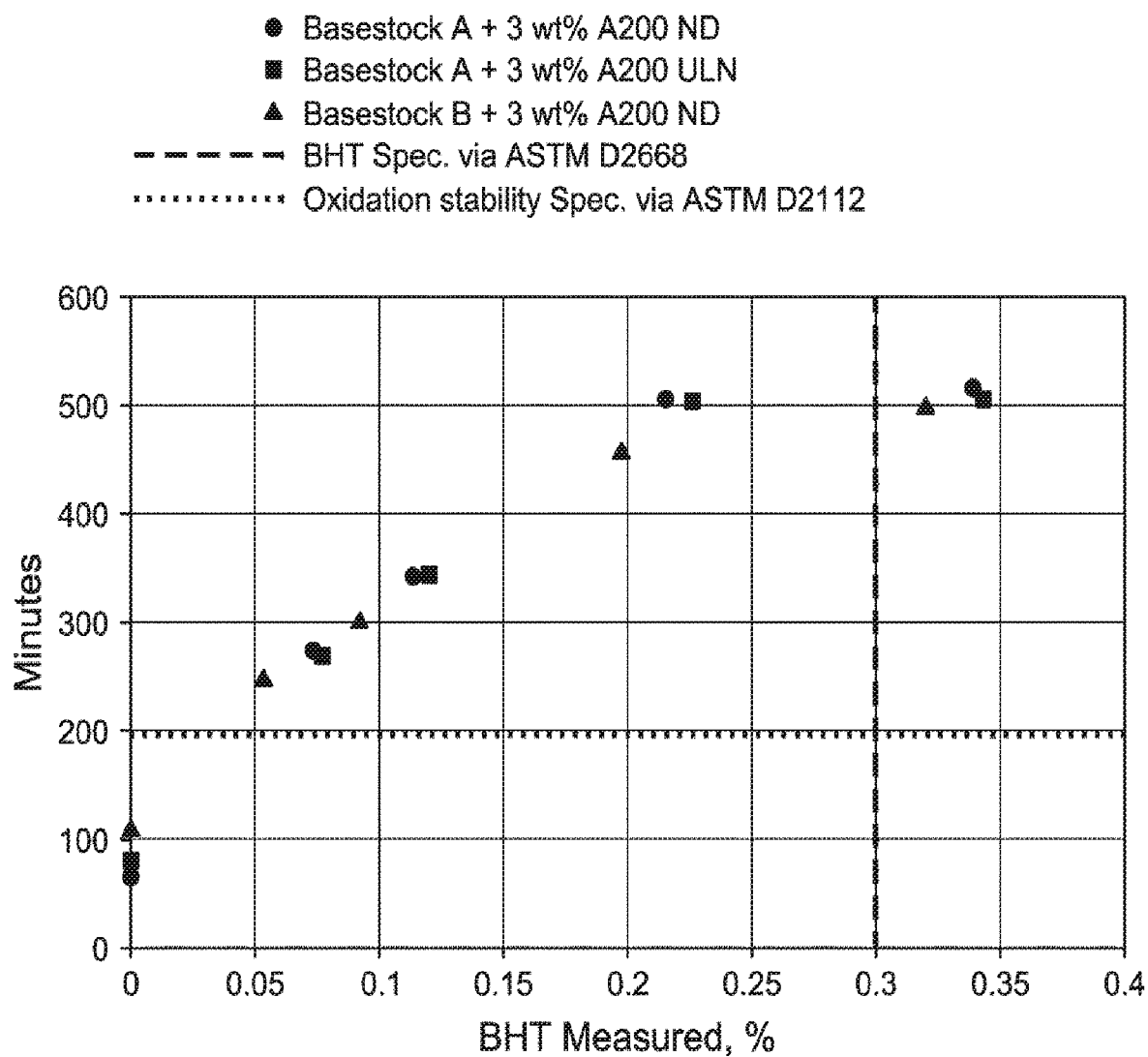
FIG. 1 shows the oxidation stability, as measured by ASTM D2112, of transformer oil compositions comprising Transformer Oil Basestock A or B, 3 wt % A200 ND or A200 ULN, and 0 to 0.34 wt % BHT (butylated hydroxytoluene) (as measured by ASTM D2668), based on the weight of the transformer oil composition.

As used herein, the expression "transformer oil composition" refers to a composition that can be used for insulating/cooling power and distribution electrical equipment, such as transformers, capacitors, tap changers, regulators, fuses, circuit breakers, switches and cables, and other oil-immersed electrical equipment and that meets electrical insulating oil specifications and testing protocols defined by ASTM D3487-16 and/or IEC 60296 (Edition 4.0 2012-02). The expression "transformer oil composition" may be used interchangeably with the expressions transformer oil or dielectric fluid or insulating oil or electrical oil or electrical insulating oil. The expression "transformer oil basestock" refers to a basestock suitable for use in a transformer oil composition.

As used herein, the expression "paraffins" refers to acyclic saturated hydrocarbons of general chemical formula $C_nH_{2n+2}$; the expression "n-paraffins" refers to normal paraffins or linear paraffins which are straight-chain acyclic saturated hydrocarbons; the expression "isoparaffins" refers to branched paraffins which are branched acyclic saturated hydrocarbons; the expression "naphthenes" refers to cycloparaffins which are cyclic non-aromatic hydrocarbons; and the expression "aromatics" refers to aromatic hydrocarbons, i.e. hydrocarbons containing at least one aromatic ring.

In a first aspect, embodiments disclosed herein provide a transformer oil basestock comprising at least 99 wt % of naphthenes and paraffins, wherein the weight ratio of naphthenes to paraffins is at least 1, and wherein the paraffins consist essentially of isoparaffins. The respective amounts of naphthenes and paraffins, based on the total weight of the transformer oil basestock, and therefore the weight ratio of said naphthenes to paraffins, may suitably be measured by GC-MS. As used herein, the expression "paraffins consist essentially of isoparaffins" intends to denote that no n-paraffin peaks were identified by GC-FID, i.e. no n-paraffin peaks were large enough to extend above the unresolved complex mixture as analysed by GC-FID (detection limit of 3 wt % n-paraffins, based on the total weight of the hydrocarbon fluid), so that all the paraffins present in the mixture can be considered as isoparaffins. In view of the detection limit of the GC-FID method, i.e. 3 wt % n-paraffins based on the total weight of the transformer oil basestock, the expression "paraffins consist essentially of isoparaffins" means that the transformer oil basestock of the first aspect of the present invention contains less than 3 wt % n-paraffins. The transformer oil basestock of at least some of the embodiments disclosed herein may thus be considered as consisting essentially of naphthenes and paraffins, especially as consisting essentially of naphthenes and isoparaffins. In particular, the transformer oil basestock of embodiments disclosed herein may comprise at least 99.5 wt % of naphthenes and paraffins, for instance at least 99.8 wt % of naphthenes and paraffins, and/or the weight ratio of naphthenes to paraffins may be greater than 1, more preferably from greater than 1 to 4, most preferably from 1.2 to 3, such as from 1.5 to 2.4.

In a preferred embodiment of this first aspect, the transformer oil basestock may comprise from 50 to 80 wt % naphthenes and from 20 to 50 wt % paraffins, such as from 55 to 70 wt % or from 60 to 70 wt % naphthenes and from 30 to 45 wt % or from 30 to 40 wt % paraffins, based on the total weight of the transformer oil basestock, as measured by GC-MS, in particular with a weight ratio of naphthenes to paraffins from greater than 1.0 to 4.0, especially from 1.2 to 3.0, such as from 1.5 to 2.4.

In a further preferred embodiment of the first aspect, the transformer oil basestock comprises no more than 1 wt % of total aromatics, in particular less than 1 wt % of total aromatics, preferably no more than 0.6 wt % of total aromatics, and more preferably no more than 0.2 wt % of total aromatics, based on the total weight of the transformer oil basestock, as measured by ASTM D7419.

In another preferred embodiment of the first aspect, the transformer oil basestock has a naphthenic carbon content (% $C_N$) of from 20 to 50%, a paraffinic carbon content (% $C_P$) of from 50 to 80%, and an aromatic carbon content (% $C_A$) of less than 1%, based on the total weight of the transformer oil basestock, as measured by ASTM D2140; in particular a % $C_N$ of from 30 to 40%, a % $C_P$ of from 60 to 70%, and a % $C_A$ of no more than 0.2%.

In an especially preferred embodiment of the first aspect, the transformer oil basestock comprises from 50 to 80 wt % naphthenes and from 20 to 50 wt % paraffins, based on the total weight of the transformer oil basestock, as measured by GC-MS, in particular with a weight ratio of naphthenes to paraffins from greater than 1.0 to 4.0, especially from 1.2 to 3.0, such as from 1.5 to 2.4; an undetectable level of n-paraffins as determined by GC-FID; and no more than 0.2 wt % of total aromatics, based on the total weight of the transformer oil basestock, as measured by ASTM D7419; and has a % $C_N$ of from 20 to 50%, a 6% $C_P$ of from 50 to 80%, and a % $C_A$ of no more than 0.2%, based on the total weight of the transformer oil basestock, as measured by ASTM D2140; for example from 55 to 70%% t % or from 60 to 70 wt % naphthenes and from 30 to 45 wt % or from 30 to 40 wt % paraffins, based on the total weight of the transformer oil basestock, as measured by GC-MS, an undetectable level of n-paraffins as determined by GC-FID, and no more than 0.2 wt % aromatics, based on the total weight of the transformer oil basestock, as measured by ASTM D7419, and a % $C_N$ of from 30 to 40%, a % $C_P$ of from 60 to 70%, and a % $C_A$ of no more than 0.2%, based on the total weight of the transformer oil basestock, as measured by ASTM D2140.

The transformer oil basestock of at least some embodiments disclosed herein usually has an initial boiling point (IBP) of at least 250° C. such as at least 270° C. or at least 280° C., and a final boiling point (FBP) of at most 410° C., such as at most 390° C. or at most 380° C., as measured by ASTM D86. The distillation range as defined by (FBP-IBP) is advantageously at most 100° C., for example from 20 to 90° C., as measured by ASTM D86. The distillation range as defined by ($T_{90}$-$T_{10}$) is advantageously of at most 60° C., for instance from 10 to 50° C., as measured by ASTM D86. In an alternative, the transformer oil basestock of at least some embodiments disclosed herein may have an initial boiling point (IBP) of at least 190° C., such as at least 200° C. or at least 210° C., and a final boiling point (FBP) of at most 450° C., such as at most 440° C. or at most 430° C., as measured by ASTM D2887. The distillation range as defined by (FBP-IBP) is advantageously at most 250° C., for example from 100 to 220° C. as measured by ASTM D2887. The distillation range as defined by ($T_{90}$-$T_{10}$) is advantageously of at most 150° C. for instance from 30 to 100° C. as measured by ASTM D2887. In the context of the embodiments disclosed herein, $T_{[x]}$ boiling points can be understood to represent the temperature at which "x" percent of the basestock has been recovered by volume.

The transformer oil basestock of at least some embodiments typically has a flash point of at least 145° C., preferably at least 150° C., as measured by ASTM D92.

The transformer oil basestock of at least some embodiments generally has a pour point of at most −40° C., preferably at most −45° C., as measured by ASTM D97.

The transformer oil basestock of at least some embodiments typically has a kinematic viscosity at 100° C. of at most 3 mm²/s, in particular from 1 to 3 mm²/s, such as from 1.5 to less than 3 mm²/s or from 2 to less than 3 mm²/s, and % or a kinematic viscosity at 40° C. of at most 12 mm²/s, particularly from 4 to 12 mm²/s, such as from 5 to less than 11 mm²/s or from 6 to 10 mm²/s. The kinematic viscosities at 100° C., and 40° C. are as measured by ASTM D445.

The transformer oil basestock of at least some embodiments typically has a viscosity index (VI) of at least 80, as calculated based on ASTM D2270.

The specific gravity (or relative density) at 15.6° C. of the transformer oil basestock of at least some embodiments is typically at most 0.91, especially from 0.82 to 0.86, as measured by ASTM D1298.

The transformer oil basestock of at least some embodiments typically has an aniline point of at least at least 80° C., preferably of at least 85° C., as measured by ASTM D611.

The transformer oil basestock of at least some embodiments may be obtainable by a process comprising at least one of hydrodemetallization, hydrotreating, hydrocracking, hydrodewaxing, hydrofinishing, and fractionation of a feedstock. In an especially preferred embodiment, the transformer oil basestock is obtainable by a process comprising solvent extraction, hydrodemetallization, hydrotreating, hydrodewaxing, hydrofinishing, and fractionation, especially vacuum fractionation, of a feedstock. An especially suitable feedstock is a vacuum gas oil feedstock. In an even more preferred embodiment, the transformer oil basestock is recovered as a sidestream from the fractionation step of a process that produces Group II base oils such as those disclosed in U.S. Pat. Nos. 5,911,874, 6,096,189, 6,951,605, and 9,587,184, all of which are incorporated herewith by reference. In another preferred embodiment, the transformer oil basestock may be obtainable from feeds such as vacuum resid or other 510° C.+ feeds, e.g. a feedstock having a T5 boiling point of at least 370° C., by a process comprising solvent deasphalting to produce a deasphalted oil which is fed, possibly with another feed such as vacuum gas oil, to lubes processing, such as a process comprising at least one of solvent extraction, hydrodemetallization, hydrotreating, hydrocracking, hydrodewaxing, hydrofinishing, and fractionation, for instance a process comprising solvent extraction, hydrodemetallization, hydrotreating, hydrodewaxing, hydrofinishing, and fractionation. Examples of such processes are disclosed in US 2017/0183576, US 2017/0183577, and US 2017/0183578, all of which are incorporated herewith by reference. In still another preferred embodiment, the transformer oil basestock may be obtainable from feeds such as heavy gas oil, vacuum gas oil, heavy vacuum gas oil, light vacuum gas oil, heavy coker gas oil, and/or hydrotreated heavy coker gas oil, by a process comprising at least hydrotreating, hydrocracking, hydrodewaxing, and fractionation. Examples of such processes are disclosed in U.S. Pat. Nos. 8,394,255, 8,617,383, 8,992,764, 9,309,472, and 9,394,494, all of which are incorporated herewith by reference.

In a second aspect, the embodiments disclosed herein provide a transformer oil composition comprising the transformer oil basestock of the first aspect, an anti-gassing agent, and an antioxidant.

The gassing tendency of an oil is a measure of the rate at which a gas, especially hydrogen gas, is evolved or absorbed in an insulating medium when that medium is subjected to electrical stress sufficient to cause ionization. A low (negative) gassing tendency is desirable since, if hydrogen is evolved due to electrical stress, a transformer oil composition having low (negative) gassing tendency will tend to absorb the evolved hydrogen and thereby minimize the build-up of hydrogen gas, which in the presence of oxygen and a discharge spark could cause an explosion in the electrical device. This is advantageous in terms of reducing equipment failure, particularly in cables and capacitors. The gassing tendency of transformer oil compositions is measured by test method ASTM D2300. Oils that evolve hydrogen gas have a positive test value, and those that absorb hydrogen gas have a negative test value.

The transformer oil composition of the second aspect may have a gassing tendency at 80° C. of about 0 µL/min. or less, especially less than 0 µL/min., preferably less than −20 µL/min., more preferably less than −30 µL/min., even more preferably less than −40 µL/min., for instance less than −50, −60 or even −70 µL/min.

An anti-gassing agent generally comprises an aromatic compound that comprises at least one labile hydrogen atom. As used herein, the term "anti-gassing agent" can be used interchangeably with degassing agent or gassing additive. Examples of suitable anti-gassing agents include alkyl substituted or unsubstituted, partially saturated polyring aromatics (e.g. polyaromatics with some degree of saturation), alkyl substituted one ring aromatics (e.g. alkyl benzenes), or alkyl substituted polyring aromatics (e.g. alkyl naphthalenes), in particular bicyclic, partially saturated, aromatics or alkyl substituted monoaromatics. Examples of bicyclic, partially saturated aromatic compounds include di- and tetrahydronaphthalene compounds and alkyl substituted hydronaphthalene compounds such as alkyl tetrahydronaphthalenes. The anti-gassing agent may also be selected from dihydrophenanthrenes, phenyl ortho xylyl ethane, alkyl benzenes, tetrahydro-5-(1-phenylethyl)-naphthalene, acenapthene, tetrahydronaphthalenes, alkyl tetrahydronaphthalenes, and tetrahydroquinoline. Such anti-gassing agents are disclosed in US 200910001330 and WO 2007/027782, which are included herewith by reference.

Especially suitable anti-gassing agents include aromatic reformer distillates such as those disclosed in U.S. Pat. No. 8,298,451, which is incorporated herein by reference. Such aromatic reformer distillates are mixtures of 1- and 2-ring aromatic compounds and are characterized by having a minimum content of 1- and 2-ring aromatics of 98 wt %, based on reformer distillate. Examples of suitable 1- and 2-ring aromatics include alkyl benzenes, especially $C_{11}$ benzenes (or $C_5$ alkyl benzenes), and alkyl naphthalenes, preferably methyl naphthalenes, ethyl naphthalenes, dimethyl naphthalenes, and $C_{13}$ and $C_{14}$ naphthalenes (or $C_3$ or $C_4$ alkyl naphthalenes). Examples of other 1- and 2-ring aromatics include optionally alkyl substituted indanes and biphenyls (or diphenyls). The 1-ring aromatic compounds preferably comprise $C_{10}$ and greater alkyl substituted 1-ring compounds. The total amount of benzene and toluene in the reformer distillate is less than 0.02 wt %, as measured by GC-FID, and the amount of xylenes in the reformer distillate is less than 0.5 wt %, based on reformer distillate, preferably less than 0.1 wt %, as measured by GC. In an especially suitable embodiment, the carbon number distribution of the reformer distillate is $C_{10}$ to $C_{16}$, preferably $C_{11}$ to $C_{16}$. The total amount of lights (i.e., $<C_{10}$) is preferably less than 2 wt %, based on reformer distillate, preferably less than 0.5 wt %. The average molecular weight of the reformer distillate is typically between 100 and 200, preferably from 120 to 180, such as from 150 to 165. The carbon number distribution, total amount of lights (i.e., $<C_{10}$) and the average molecular weight are based on analysis by GC-FID. The distillation range as measured by ASTM D86 is from an initial boiling point (IBP) of no less than 220° C. to a dry point (DP) of no more than 305° C. The amount of naphthalene is typically less than 15 wt %, based on reformer distillate, preferably less than 10 wt %, in particular less than 5 wt %, more particularly less than 1 wt %, as measured by GC-FID. In a particularly preferred embodiment, the amount of naphthalene is no more than 0.9 wt %, based on reformer distillate. Such aromatic reformer distillates typically have the following properties: minimum flash point of 98° C. (ASTM D93), total sulfur of less than 10 wppm, preferably less than 5 wppm, based on reformer distillate, and a kinematic viscosity of <3 mm²/s at 40° C. (ASTM D445).

In an especially preferred embodiment, the anti-gassing agent is an aromatic reformer distillate having a carbon number distribution of $C_{10}$ to $C_{16}$, preferably $C_{11}$ to $C_{16}$, and having, based on reformer distillate, a minimum content of 98 wt % of 1- and 2-ring aromatics; a total content of benzene and toluene of less than 0.02 wt %; a content in naphthalene of less than 15 wt %, preferably less than 5 wt %, more preferably than 1 wt %, such as at most 0.9 wt %; a content in 1-methyl naphthalene of 5 to 20 wt %; a content in 2-methyl naphthalene of 10 to 35 wt %; a content in methyl naphthalenes of 15 to 50 wt %; a content in dimethyl naphthalenes of 8 to 25 wt %; a content in ethyl naphthalenes of 0 to 5 wt %; a content in $C_{12}$ aromatics of 15 to 30 wt %; a content in $C_{13}$ aromatics of 10 to 20 wt %; a content in $C_{14}$ aromatics of 5 to 15 wt %; a content in $C_{15}$ aromatics of 5 to 15 wt %; and a content in $C_{16}$ aromatics of 0 to 5 wt %. The carbon number distribution and the composition of the aromatic reformer distillate is as measured by GC-FID. Said anti-gassing agent typically has a flash point as measured by ASTM D93 of least 98° C., a distillation range as measured by ASTM D86 from an initial boiling point (IBP) of no less than 220° C. to a dry point (DP) of no more than 305° C.; and a kinematic viscosity at 40° C. as measured by ASTM D445 of less than 3 mm²/s, such as from 2 to 2.5 mm²/s. Especially suitable anti-gassing agents include Aromatic 200 fluid (A200), Naphthalene Depleted Aromatic 200 fluid (A200 ND), Ultra Low Naphthalene Aromatic 200 fluid (A200 ULN), Solvesso™ 200 fluid (SV200), and Naphthalene Depleted Solvesso 200 fluid (SV200 ND) which are available from ExxonMobil Corporation. Especially preferred anti-gassing agents are A200 ND and Solvesso 200 ND, which have a naphthalene content of at most 0.9 wt %, and A200 ULN, which has a naphthalene content of at most 0.1 wt %.

In at least some embodiments, the anti-gassing agent should be added in the transformer oil composition in an amount sufficient to decrease the gassing tendency of the transformer oil composition down to less than 0 µL/min., preferably less than −20 µL/min., more preferably less than −30 µL/min., even more preferably less than −40 µL/min., for instance less than −50, −60 or −70 µL/min. For instance, the anti-gassing agent may be added in an amount of at most 6 wt %, in particular at most 3 wt %, more particularly 0.5 to 3 wt %, such as 1.0 to 2.0 wt %, by weight of the transformer oil composition. Since the transformer oil basestock of at least some embodiments has a very low total aromatics content, i.e. no more than 1 wt % of total aromatics, preferably no more than 0.6 wt % of total aromatics, and more preferably no more than 0.2 wt % of total aromatics, based on the total weight of the transformer oil basestock, as measured by ASTM D7419, adding a known amount of aromatic anti-gassing agent such as A200 ND, SV200 ND, or A200 ULN allows for a very consistent aromatics content and therefore very consistent gassing tendency results. Surprisingly, it has also been found that the transformer oil basestock of at least some embodiments allows for the preparation of transformer oil compositions having negative gassing tendencies with only minimal amounts of aromatic anti-gassing agent, versus commercial base oils that actually comprise a higher amount of aromatics.

Examples of suitable antioxidants for use in the transformer oil composition of the embodiments disclosed herein include but are not limited to hindered phenols, cinnamate type phenolic esters, alkylated diphenylamines, and combinations thereof. The antioxidant may for instance be selected from the group consisting of butylated hydroxytoluene (BHT), also known as 2,6-ditertiary-butyl para-cresol, 2,6-ditertiary butylphenol, 2,6-di-tert-butyl-4-ethylphenol, 4'-methylene-bis(2,6-di-tert-butylphenol), 4,4'-bis(2,6-di-tert-butylphenol), 4,4'-bis(2-methyl-6-tert-butylphenol), 2,2'-methylene-bis(4-methyl-6-tert-butylphenol), 4,4'-butylidene-bis(3-methyl-6-tert-butylphenol), 4,4'-isopropylidene-bis(2,6-di-tert-butylphenol), 2,2'-methylene-bis(4-methyl-6-nonylphenol), 2,2'-isobutylidene-bis(4,6-dimethylphenol), 2,6-di-tert-butyl-4-methylphenol, 2,2'-5-methylene-bis(4-methyl-6-cyclohexylphenol), 2,4-dimethyl-6-tert-butyl-phenol, 2,6-di-tert-1-dimethylamino-p-cresol, 2,6-di-tert-4-(N,N'-dimethylaminomethylphenol), 4,4'-thiobis(2-methyl-6-tert-butylphenol), 2,2'-thiobis(4-methyl-6-tert-butylphenol), bis(3-methyl-4-hydroxy-5-tert-10-butylbenzyl)-sulfide, alkylated diphenylamine, bis(3,5-di-tert-butyl-4-hydroxybenzyl), phenyl-alpha-naphthylamine, and alkylated-alpha-naphthylamine. Other types of oxidation inhibitors include metal dithiocarbamate (e.g. zinc dithiocarbamate), and 15-methylenebis(dibutyldithiocarbamate). In a particularly preferred embodiment of the second aspect, the antioxidant is a hindered phenol antioxidant, such as BHT.

The antioxidant is typically used in an amount sufficient to improve the oxidation stability of the transformer oil composition, thereby minimizing the development of oil sludge and acidity during storage, processing, and service. The antioxidant may for instance be added to the transformer oil composition in an amount from 0.03 to 0.3 wt %, preferably 0.04 to 0.25 wt %, more preferably 0.05 to 0.2 wt %, for example 0.05, 0.1, or 0.2 wt %, by weight of the transformer oil composition.

The transformer oil composition of the disclosed embodiments is advantageous in that it shows an excellent oxidation stability. In particular, the transformer oil composition of the at least some of the embodiments disclosed herein has an oxidation stability of at most 0.1 wt % of sludge after 72 hours, preferably less than 0.05 wt %, more preferably less than 0.01 wt %, as measured by ASTM D2440, and/or an oxidation stability of at most 0.2 wt % of sludge after 164 hours, in particular less than 0.05 wt %, more particularly less than 0.01 wt %, as measured by ASTM D2440, and/or an oxidation stability of at least 195 minutes, preferably at least 300 minutes, such as at least 400 minutes, as measured by ASTM D2112.

The transformer oil composition of the disclosed embodiments is also advantageous in that it shows an excellent material compatibility with commonly used gasket materials such as Viton™ fluoroelastomer, Corkprene, and nitrile.

The transformer oil composition of at least some embodiments typically has a flash point of at least 145° C., preferably at least 150° C., as measured by ASTM D92.

The transformer oil composition of at least some embodiments generally has a pour point of at most −40° C., preferably at most −42° C., as measured by ASTM D97.

The transformer oil composition of at least some embodiments typically has a kinematic viscosity at 100° C. of at most 3 mm$^2$/s, in particular from 1 to 3 mm$^2$/s, such as from 1.5 to less than 3 mm$^2$/s or from 2 to less than 3 mm$^2$/s, and/or a kinematic viscosity at 40° C. of at most 12 mm$^2$/s, particularly from 4 to 12 mm$^2$/s, such as from 5 to less than 10 mm$^2$/s or from 6 to 9 mm$^2$/s, and/or a kinematic viscosity at 0° C. of at most 76 mm$^2$/s, particularly from 10 to 76 mm$^2$/s, such as from 20 to 60 mm$^2$/s or from 30 to 55 mm$^2$/s, and/or a kinematic viscosity at −30° C. of at most 500 mm$^2$/s, especially from 200 to 500 mm$^2$/s, such as from 300 to 400 mm$^2$/s, and/or a kinematic viscosity at −40° C. of at most 3,000 mm$^2$/s, for instance from 500 to 3,000 mm$^2$/s, such as from 1,000 to 2,000 mm$^2$/s. The kinematic viscosities at 100° C., 40° C., 0° C., −30° C., and −40° C. are as measured by ASTM D445.

The specific gravity (or relative density) at 15.6° C. of the transformer oil composition of at least some embodiments is typically at most 0.91, especially from 0.83 to 0.86, as measured by ASTM D1298.

The transformer oil composition of at least some embodiments typically has an aniline point of at least at least 80° C., preferably at least 85° C. such as at least 90° C., as measured by ASTM D611.

The transformer oil composition of at least some embodiments is also advantageous in that it shows excellent electrical properties, fulfilling the performance requirements of transformer oil specifications as defined by ASTM D3487-16 and IEC 60296.

The transformer oil composition of at least some embodiments may further comprise additives such as pour point depressants, metal deactivators, metal passivators, antifoaming agents, markers, biocides, antistatic additives, and other additives known in the art. Such additives are typically added in a sufficient amount to provide the desired effect, most often in an amount of from 0.001 to 10 wt %, such as 0.05 to 6 wt %, based on the weight of transformer oil composition.

Suitable examples of pour point depressants (PPD) include but are not limited to poly(meth)acrylates, polyacrylamides, alkylated polystyrenes, esters of maleic anhydride-styrene copolymers, condensation products of haloparaffin waxes and aromatic compounds, vinyl carboxylate polymers, and terpolymers of dialkylfumarates, vinyl esters of fatty acids, ethylene-vinyl acetate copolymers, alkyl phenol formaldehyde condensation resins, alkyl vinyl ethers, olefin copolymers, fumaric acid esters, and mixtures thereof.

A pour point depressant may be added to the transformer oil composition in an amount sufficient for lowering the pour point of the transformer oil composition below the lowest temperature expected for the climate in which the transformer oil composition is to be used, in particular −40° C. or lower. When a pour point depressant is present, it is usually added in an amount of from 0.01 to 2 wt %, such as from 0.01 to 0.5 wt %, based on the weight of the transformer oil composition. However, in an especially preferred embodiment of the second aspect, no pour point depressant is added to the transformer oil composition. The addition of pour point depressant may indeed result in a decrease of the interfacial tension (as measured by ASTM D971) of the resulting formulation.

Suitable metal deactivators include but are not limited to triazoles, benzotriazoles, tolyltriazoles, and tolyltriazole derivatives, e.g. 1,2,3 tolyltriazole. A metal deactivator may for instance be used in an amount of 0.001 to 1 wt % or 0.01 to 1.5 wt %, by weight of the transformer oil composition. However, in a particular embodiment of the second aspect, no metal deactivator needs to be added to the transformer oil composition.

In a third aspect, at least some embodiments disclosed herein relate to the use of the transformer oil basestock of the first aspect for preparing a transformer oil composition having an improved gassing tendency and/or an improved oxidation stability. Embodiments disclosed herein therefore also relate to the use of the transformer oil basestock of the first aspect for preparing a transformer oil composition having a gassing tendency of less than 0 μL/min., preferably less than −30 μL/min., more preferably less than −40

μL/min., even more preferably less than −45 μL/min., especially less than −50 μL/min. In particular, embodiments disclosed herein provide for the use of the transformer oil basestock of the first aspect for preparing a transformer oil composition according to the second aspect. Advantageously, this third aspect includes combining the transformer oil basestock of the first aspect with an anti-gassing agent as defined above. Embodiments disclosed herein also relate to the use of the transformer oil basestock of the first aspect for preparing a transformer oil composition having an improved oxidation stability as measured by ASTM D2440 and/or ASTM D2112 while preferably showing acceptable low temperature properties.

In a fourth aspect, embodiments disclosed herein further provide a process for the preparation of a transformer oil composition as defined in the second aspect, comprising contacting, preferably blending, the transformer oil basestock of the first aspect with an anti-gassing agent and an antioxidant as defined above. This process may further comprise drying the transformer oil basestock of the first aspect before blending with the anti-gassing agent and the antioxidant, to remove possibly absorbed water, for instance by contacting with molecular sieve absorbents, dry air or nitrogen sparging, and/or degassing. This process may also further comprise contacting said transformer oil basestock, said anti-gassing agent and said antioxidant with one or more additional additives as defined above. Contacting may be performed by mechanical stirring, optionally while heating the mixture.

The transformer oil basestock defined in the first aspect is especially suitable for the preparation of transformer oil compositions. Such basestock is also especially suitable for a number of additional end-uses including AgChem (e.g. agricultural spray oils), high viscosity low pour point base oils for drilling muds, silicone oil extenders, acrylic and silicone mastics and sealants, adhesives, explosive formulations (e.g. emulsions and ammonium nitrate/fuel oil), printing inks (e.g. printing ink distillates for off-set printing, piezo ink jet technology, cold-set printing, and heat-set printing), diluent oils for lube additives, spindle oils, coolants (e.g. battery coolants, coolants for data storage, process coolant fluids), heat transfer fluids, electric vehicle fluids (e.g. coolant or heat transfer fluid for batteries, motors and/or electrical components), metal working fluids, plasticizers, mold oils, coning oils, dust control fluids, collector fluids in floatation processes such as mining floatation, mining extraction, metal extraction, process fluids, hydraulic oils, animal vaccines, paints and coatings, industrial and institutional cleaners, consumer products, lubricants, automotive lubricants, and transmission fluids. In some cases further fractionation and/or additivation may be necessary.

In a fifth aspect, at least some embodiments therefore provide for the use of a basestock as defined in the first aspect in end-uses selected from the group consisting of AgChem (e.g. agricultural spray oils), high viscosity low pour point base oils for drilling muds, silicone oil extenders, acrylic and silicone mastics and sealants, adhesives, explosive formulations, printing inks (e.g. printing ink distillates for off-set printing, piezo ink jet technology, cold-set printing, and heat-set printing), diluent oils for lube additives, spindle oils, coolants (e.g. battery coolants, coolants for data storage, process coolant fluids), heat transfer fluids, electric vehicle fluids (e.g. coolant or heat transfer fluid for batteries, motors and/or electrical components), metal working fluids, plasticizers, mold oils, coning oils, dust control fluids, collector fluids in floatation processes such as mining floatation, mining extraction, metal extraction, process fluids, hydraulic oils, animal vaccines, paints and coatings, industrial and institutional cleaners, consumer products, lubricants, automotive lubricants, and transmission fluids.

Should the disclosure of any patents, patent applications, and publications which are incorporated herein by reference conflict with the description of the present application to the extent that it might render a term unclear, the present description shall take precedence.

EXAMPLES

Particular reference will now be made to the following non-limiting examples.

Example 1—Transformer Oil Basestocks A and B

Transformer Oil Basestocks A and B are base oils consisting essentially of naphthenes and isoparaffins. These transformer oil basestocks were prepared by a process comprising solvent extracting a vacuum gas oil feedstock followed by hydrodemetallization, hydrotreating, hydrodewaxing, hydrofinishing, and vacuum fractionation. In particular, these transformer oil basestocks correspond to a sidestream recovered from a process that produces Group II base oils.

The compositions and typical properties of Transformer Oil Basestocks A and B are summarized in Tables 1 and 2 below.

TABLE 1

| Composition | Transformer Oil Basestock A | Transformer Oil Basestock B |
| --- | --- | --- |
| GC-MS (wt %) | | |
| Total paraffins | 37 | 32 |
| Total naphthenes | 63 | 68 |
| Weight ratio naphthenes to paraffins | 1.7 | 2.1 |
| GC-FID (wt %) | | |
| n-paraffins ASTM D7419-13 (wt %) | None Detected | None Detected |
| Total saturates | >99.8 | >99.8 |
| Total aromatics | <0.2 | <0.2 |
| ASTM D2140-03 | | |
| % $C_N$ | 33 | 38 |
| % $C_P$ | 67 | 62 |
| % $C_A$ | 0 | 0 |

TABLE 2

| Properties | Test Methods | Transformer Oil Basestock A | Transformer Oil Basestock B |
| --- | --- | --- | --- |
| Kv @ 100° C. (mm$^2$/s) | ASTM D445 | 2.3-2.6 | 2.1-2.2 |
| Kv @ 40° C. (mm$^2$/s) | ASTM D445 | 8.0-9.5 | 7.0-7.6 |
| VI | ASTM D2270 | 100 | 80 |
| Flash point (° C.) | ASTM D92 | >145 | >145 |
| Pour point (° C.) | ASTM D97 | <−40 | <−40 |
| Distillation (° C.) | ASTM D86 | | |
| IBP | | 280-305 | 285-300 |
| $T_{10}$ | | 305-330 | 305-315 |
| $T_{90}$ | | 350-370 | 330-345 |

TABLE 2-continued

| Properties | Test Methods | Transformer Oil Basestock A | Transformer Oil Basestock B |
|---|---|---|---|
| FBP | | 360-375 | 335-355 |
| FBP-IBP | | 65-80 | 45-60 |
| T90-T10 | | 35-30 | 20-30 |
| Distillation (° C.) | ASTM D2887 | | |
| IBP | | 210-235 | 220-235 |
| $T_{10}$ | | 285-315 | 290-305 |
| $T_{90}$ | | 380-400 | 350-365 |
| FBP | | 395-430 | 360-400 |
| FBP-IBP | | 170-210 | 135-170 |
| T90-T10 | | 80-95 | 55-65 |
| Specific gravity @ 15.6° C. | ASTM D4052 | 0.8375-0.8425 | 0.8425-0.8475 |

The hydrocarbon types of the transformer oil basestocks, in terms of total paraffins and total naphthenes, were determined by GC-MS based on ASTM D2786-91 which covers the hydrocarbon types analysis of gasoil saturates fractions. Sample preparation: 50 µl of the sample as such was added to an auto-sampler vial filled with hexane. GC conditions: instrument Agilent 7890 Series or equivalent; column HP-SMS, 30 m×0.25 mm ID, 0.25 µm film thickness; temperature profile of 50° C. for 2 min. then to 320° C. at 20° C./min and 2.5 min. at the final temperature; injector temperature of 280° C.; injection mode split 1/100; injection volume 0.5 µL; detector transfer line 280° C.; constant flow 1.0 mL/min. helium. MS conditions: instrument Agilent 5975C Series or equivalent; solvent delay 3.5 min; scan range 65-410 a.m.u; threshold 100; tune file Stune.U; calibration product is perfluorotributylamine. The calculations were done based on ASTM D2786-91 (see paragraph 4.1). The characteristic mass groupings were:

Σ71=71+85+99+113 (alkanes)

Σ69=69+83+97+111+125+139 (1-ring)

Σ109=109+123+137+151+165+179+193 (2-ring)

Σ149=149+163+177+191+205+219+233+247 (3-ring)

Σ189=189+203+217+231+245+259+273+287+301 (4-ring)

Σ229=229+243+257+271+285+299+313+327+341+355 (5-ring)

Σ269=269+283+297+311+325+339+353+367+381+395+409 (6-ring)

Σ91=91+105+117+119+129+131+133+143+145+147+157+159+171 (monoaromatic).

The calculations were done using the PCMASPEC D2786 software by R. M. Teeter which allows the manual selection of the matrix number (one matrix for each average carbon number) and of the type of matrix (normal or branched paraffins) to be used. The abundance of each hydrocarbon type is calculated with both the branched and the normal matrix of the selected carbon number and a weighted average is made taking into account the amount of n-paraffins determined by GC-FID. The results correspond to the amounts of naphthenes and paraffins (as the sum of n-paraffins and isoparaffins) expressed in wt %. The amount of isoparaffins is obtained by subtracting the amount of n-alkanes from the amount of paraffins. In the transformer oil basestock of the present disclosure, it is considered that all the paraffins are isoparaffins since no n-paraffin peaks were identified by GC-FID as determined by the method detailed below.

The presence or absence of n-paraffin peaks was determined by GC-FID using a gas chromatograph (HP6890 Series or equivalent). The apparatus was operated in accordance with the manufacturer's instructions with the following operating conditions: temperature profile of 50° C. to 300° C. at 5° C./min, and 20 min. at the final temperature; injector temperature of 250° C.; injection mode split 1/100; injection volume 0.4 µL; detector temperature 320° C.; column fused silica DB-1, 30 m×0.25 mm ID, 1 µm film thickness; constant flow 1.5 mL/min. helium; detector FID; detector gases hydrogen 40 mL/min, and air 400 mL/min. Calibration was made using a normal paraffin calibration standard/reference (e.g. from Sigma-Aldrich) to encompass the carbon number range for the material being tested, the standard/reference material having a minimum purity of 99% n-paraffins and containing at least 5 n-paraffins in the carbon number range of interest at comparable and known concentrations. Calibration and standardization were done by determining the retention times for the normal paraffins in the standard/reference. Using the apparatus and parameters mentioned above, obtain a GC fingerprint of the sample material. Using the normal paraffin retention times established through calibration and standardization as a guide, identify the normal paraffin peaks of the test sample, if any.

Example 2—Transformer Oil Compositions

Transformer oil compositions were prepared by blending Transformer Oil Basestock A or Transformer Oil Basestock B with 0.20 or 0.26 wt % BHT as antioxidant, 0 to 6 wt % A200 ND or A200 ULN as anti-gassing agent, and optionally 0.4 wt % of Viscoplex 1-300 as a pour point depressant (PPD). The physical, electrical, and chemical properties of the resulting transformer oil compositions (A to T) are detailed in Table 3 below.

A200 ND and A200 ULN are aromatic reformer distillate having, based on reformer distillate, a minimum content of 98 wt % of 1- and 2-ring aromatics, and having a carbon number distribution of respectively $C_{10}$ to $C_{16}$ and $C_{11}$ to $C_{16}$ and a naphthalene content of respectively maximum 0.9 and 0.1 wt %, as determined by GC-FID. The carbon number distribution and the composition of the aromatic reformer distillates were determined using a gas chromatograph (HP6890 Series or equivalent). The apparatus was operated in accordance with the manufacturer's instructions with the following operating conditions: temperature profile of 100° C. to 150° C. at 1° C./min. then to 200° C. at 3° ° C./min, and 30 min. at the final temperature; injector temperature of 250° C.; injection mode split 1/150; injection volume 0.4 µL; detector temperature 320° C.; column fused silica DB-1, 30 m×0.25 mm ID, 1 µm film thickness; constant flow helium 24 psi; detector FID; detector gases hydrogen 40 mL/min, and air 400 mL/min. Identification of the peaks was obtained by comparison of retention times and co-injection of reference compounds with the sample, if required. For unknown peaks. GC-MS can be performed. Calculations were made using the normalization technique, in which each compound was expressed as an area percentage of the whole eluting components area.

TABLE 3

| EXAMPLES | | A | B | C | D | E | F | G | H | I | J |
|---|---|---|---|---|---|---|---|---|---|---|---|
| Transformer oil basestock A (wt %) | | balance | balance | balance | balance | balance | balance | balance | balance | balance | balance |
| Transformer oil basestock B (wt %) | | — | — | — | — | — | — | — | — | — | — |
| A200 ND (wt %) | | — | 3 | 3 | 6 | 1 | 2 | 3 | — | — | — |
| A200 ULN (wt %) | | — | — | — | — | — | — | — | 1 | 2 | 3 |
| BHT (wt %) | | 0.26 | 0.26 | 0.26 | 0.26 | 0.20 | 0.20 | 0.20 | 0.20 | 0.20 | 0.20 |
| PPD (wt %) | | — | — | 0.4 | — | — | — | — | — | — | — |
| PHYSICAL PROPERTIES | ASTM | | | | | | | | | | |
| Aniline Point (° C.) | D611 | 99.7 | 97.5 | 95.1 | 95.1 | 98.0 | 97.1 | 96.2 | 98.1 | 97.1 | 96.1 |
| Flash Point (° C.) | D92 | 166 | 162 | 166 | 154 | 166 | 162 | 162 | 160 | 154 | 158 |
| Pour Point (° C.) | D97 | −51 | −49 | <−69 | −51 | −42 | −51 | −51 | −43 | −49 | −43 |
| Interfacial Tension (mN/m) | D971 | 49 | 53 | 36 | 50 | 49 | 51 | 51 | 52 | 48 | 52 |
| Specific Gravity (Rel. Density) @ 15° C. | D1298 | 0.840 | 0.843 | 0.844 | 0.847 | 0.857 | 0.842 | 0.842 | 0.838 | 0.839 | 0.840 |
| Viscosity @ 100° C. (mm2/s) | D445 | 2.54 | 2.43 | 2.47 | 2.35 | 2.39 | 2.34 | 2.32 | 2.31 | 2.27 | 2.24 |
| Viscosity @ 40° C. (mm2/s) | D445 | 9.51 | 8.93 | 8.95 | 7.71 | 8.71 | 8.36 | 8.20 | 8.18 | 7.96 | 7.73 |
| Viscosity @ 0° C. (mm2/s) | D445 | 52.76 | 47.25 | 47.44 | 42.81 | 44.67 | 43.56 | 41.29 | 40.58 | 40.56 | 38.74 |
| Viscosity @ −30° C. (mm2/s) | D445 | — | — | — | — | — | — | — | — | 371 | — |
| Viscosity @ −40° C. (mm2/s) | D445 | — | — | — | — | — | — | — | — | 1546 | — |
| Viscosity (Saybolt) | D2161 | 57.1 | 55.2 | 55.2 | 51.1 | 54.4 | 53.3 | 52.7 | 52.7 | 51.9 | 51.2 |
| ELECTRICAL PROPERTIES | | | | | | | | | | | |
| Gassing Tendency (uL/min) | D2300 | +48.0 | −69.3 | −69.5 | −81.2 | −6.9 | −49.1 | −63.4 | −1.9 | −53.4 | −63.8 |
| CHEMICAL PROPERTIES | | | | | | | | | | | |
| Sludge, 72 hrs.-Tube 1 (%) | D2440 | <0.01 | <0.01 | <0.01 | <0.01 | <0.01 | <0.01 | <0.01 | <0.01 | <0.01 | <0.01 |
| Neut. Number, 72 hrs.-Tube 1 (mgKOH/g) | D2440 | <0.01 | <0.01 | <0.01 | <0.01 | <0.01 | <0.01 | <0.01 | <0.01 | <0.01 | <0.01 |
| Sludge, 164 hrs.-Tube 1 (%) | D2440 | <0.01 | <0.01 | <0.01 | <0.01 | <0.01 | <0.01 | <0.01 | <0.01 | <0.01 | <0.01 |
| Neut. Number, 164 hrs.-Tube 1 (mgKOH/g) | D2440 | <0.01 | <0.01 | <0.01 | <0.01 | <0.01 | <0.01 | <0.01 | <0.01 | <0.01 | <0.01 |
| Rotary Bomb (minutes) | D2112 | 715 | 507 | 473 | 482 | 536 | 547 | 509 | 524 | 526 | 541 |
| Inhibitor Content (%) | D2668 | 0.31 | 0.30 | 0.29 | 0.29 | 0.24 | 0.24 | 0.23 | 0.22 | 0.22 | 0.22 |

| | | EXAMPLES | | | | | | | | | | Ref. Caltran 60-30 |
|---|---|---|---|---|---|---|---|---|---|---|---|---|
| | | K | L | M | N | O | P | Q | R | S | T | |
| Transformer oil basestock A (wt %) | | — | — | — | — | — | — | — | — | — | — | — |
| Transformer oil basestock B (wt %) | | balance | balance | balance | balance | balance | balance | balance | balance | balance | 81.2 | — |
| A200 ND (wt %) | | — | 1 | 2 | 3 | 3 | 6 | 3 | 3 | — | 15.6 | — |
| A200 ULN (wt %) | | — | — | — | — | — | — | — | — | 3 | 3 | — |
| BHT (wt %) | | 0.26 | 0.20 | 0.20 | 0.26 | 0.26 | 0.26 | 0.2 | 0.20 | 0.20 | 0.20 | — |
| PPD (wt %) | | — | — | — | 0.4 | — | — | — | — | — | — | — |
| PHYSICAL PROPERTIES | ASTM | | | | | | | | | | | |
| Aniline Point (° C.) | D611 | 95.3 | 93.1 | 92.2 | 90.1 | 92.1 | 88.5 | 89.7 | 91.1 | 91 | 95.3 | 78.9 |
| Flash Point (° C.) | D92 | 168 | 160 | 156 | 158 | 152 | 154 | 164 | 154 | 150 | 158 | 149 |
| Pour Point (° C.) | D97 | −58 | −54 | −54 | −58 | >−66 | −59 | −42 | −57 | −57 | −51 | −57 |
| Interfacial Tension (mN/m) | D971 | 54 | 52 | 50 | 52 | 36 | 52 | 50 | 49 | 51 | 52 | 48 |
| Specific Gravity (Rel. Density) @ 15° C. | D1298 | 0.845 | 0.847 | 0.848 | 0.849 | 0.848 | 0.853 | 0.848 | 0.850 | 0.848 | 0.841 | 0.875 |
| Viscosity @ 100° C. (mm2/s) | D445 | 2.18 | 2.14 | 2.12 | 2.09 | 2.20 | 2.01 | 1.98 | 2.12 | 1.99 | 2.21 | 2.25 |
| Viscosity @ 40° C. (mm2/s) | D445 | 7.74 | 7.51 | 7.34 | 7.2 | 7.68 | 6.76 | 6.58 | 7.34 | 6.61 | 7.79 | 8.63 |
| Viscosity @ 0° C. (mm2/s) | D445 | 38.75 | 37.75 | 36.65 | 35.19 | 36.56 | 23.86 | 31.31 | 37.00 | 31.39 | 54.42 | 53.72 |
| Viscosity @ −30° C. (mm2/s) | D445 | — | — | — | — | — | — | — | — | — | — | — |
| Viscosity @ −40° C. (mm2/s) | D445 | — | — | — | — | — | — | — | — | — | — | — |
| Viscosity (Saybolt) | D2161 | 51.2 | 50.4 | 49.9 | 49.4 | 51 | 48 | 47.4 | 49.9 | 47.5 | 51.4 | — |
| ELECTRICAL PROPERTIES | | | | | | | | | | | | |
| Gassing Tendency (uL/min) | D2300 | +54.3 | −2.2 | −43.1 | −58.1 | −23.1 | −78.1 | −69.0 | −36.0 | −40.3 | −59.0 | +11 |
| CHEMICAL PROPERTIES | | | | | | | | | | | | |
| Sludge, 72 hrs.-Tube 1 (%) | D2440 | <0.01 | <0.01 | <0.01 | <0.01 | <0.01 | <0.01 | <0.01 | <0.01 | <0.01 | <0.01 | 0.01 |
| Neut. Number, 72 hrs.-Tube 1 (mgKOH/g) | D2440 | <0.01 | <0.01 | <0.01 | <0.01 | <0.01 | <0.01 | <0.01 | <0.01 | <0.01 | <0.01 | 0.01 |
| Sludge, 164 hrs.-Tube 1 (%) | D2440 | <0.01 | <0.01 | <0.01 | <0.01 | <0.01 | <0.01 | <0.01 | <0.01 | <0.01 | <0.01 | 0.01 |
| Neut. Number, 164 hrs.-Tube 1 (mgKOH/g) | D2440 | <0.01 | <0.01 | <0.01 | <0.01 | <0.01 | <0.01 | <0.01 | <0.01 | <0.01 | <0.01 | 0.04 |
| Rotary Bomb (minutes) | D2112 | 573 | 496 | 490 | 491 | 428 | 461 | 466 | 464 | 453 | 492 | 301 |
| Inhibitor Content (%) | D2668 | 0.30 | 0.23 | 0.23 | 0.29 | 0.30 | 0.29 | 0.23 | 0.22 | 0.23 | 0.21 | 0.27 |

These results show that transformer oil compositions with excellent physical and chemical properties as well as with excellent gassing tendencies can be prepared by combining a transformer oil basestock according to the embodiments disclosed herein, an antioxidant such as BHT, and an anti-gassing agent such as A200 ND or A200 ULN. In particular, transformer oil compositions B to J and L to T show a high flash point, a low pour point, a high oxidation stability and an especially low gassing tendency. The kinematic viscosities at −30° C., and −40° C. of composition I also show that the transformer oil compositions of the disclosed embodiments have excellent low temperature properties (low viscosity at low temperature). This result was confirmed for another composition based on Transformer Oil Basestock A, 1.0 wt % of A200 ULN, and 0.1 wt % of BHT which showed a kinematic viscosity of 36.4 mm$^2$/s at 0° C., of 340 mm$^2$/s at −30° C., and of 1,461 mm$^2$/s at −40° C. The low viscosities at low temperatures are especially advantageous for good heat transfer in cold climates, thus maintaining good oil flow inside the transformer which facilitates good cooling of the energized parts immersed in the oil. The low viscosities at low temperatures are also advantageous for cold starts of transformers in cold climates, when the transformer is not warm yet. In addition (not shown in Table 3), compositions B, D to J, K to N, and P to T showed excellent electrical properties, fulfilling the performance requirements of transformer oil specifications as defined by ASTM D3487-16 and IEC 60296 in terms of impulse breakdown voltage, dielectric breakdown voltage, and power factor. It can also be seen by comparing compositions C and O to compositions B and N that a pour point depressant should preferably not be added to the formulations: the addition of a pour point depressant resulted in a significant decrease of the interfacial tensions of the formulations.

The transformer oil compositions of the disclosed embodiments were also compared to a commercial transformer oil composition, Caltran™ 60-30, an inhibited (Type II) naphthenic transformer oil commercialized by Calumet. The product datasheet showed that the Calumet product has a positive gassing tendency and a lower oxidation stability as measured by ASTM D2112 as compared to the transformer oil compositions of the disclosed embodiments.

Example 3—Oxidation Stability of Transformer Oil Compositions

The oxidation stabilities of transformer oil compositions based on Transformer Oil Basestocks A and B were determined following the procedure of ASTM D2112. Said transformer oil compositions comprised Transformer Oil Basestock A or B, 3 wt % A200 ND or A200 ULN as anti-gassing agent, and 0 to 0.34 wt % BHT (as measured by ASTM D2668), based on the weight of the transformer oil composition.

FIG. 1 shows the effect of the amount of BHT on the oxidation stability of the resulting transformer oil compositions. The oxidation stabilities of said transformer oil compositions were also determined following the procedure of ASTM D2440. The results are summarized in Table 4 below.

TABLE 4

|  | BHT Measured (wt %) | Sludge 72 h (wt %) | Total Acid Number 72 h (mgKOH/g) | Sludge 164 h (wt %) | Total Acid Number 164 h (mgKOH/g) |
| --- | --- | --- | --- | --- | --- |
| ASTM D3487 Specification (Type I) | 0.08 max. | 0.15 max. | 0.5 max. | 0.3 max. | 0.6 max. |
| ASTM D3487 Specification (Type II) | 0.30 max. | 0.1 max. | 0.3 max. | 0.2 max. | 0.4 max. |
| Transformer Oil Basestock A + 3 wt % A200 ND | 0 | 6.15 | 37.10 | 31.39 | 37.03 |
|  | 0.073 | <0.01 | <0.01 | <0.01 | <0.01 |
|  | 0.113 | <0.01 | <0.01 | <0.01 | <0.01 |
|  | 0.215 | <0.01 | <0.01 | <0.01 | <0.01 |
|  | 0.338 | <0.01 | <0.01 | <0.01 | <0.01 |
| Transformer Oil Basestock A + 3 wt % A200 ULN | 0 | 8.65 | 32.80 | 43.82 | 26.55 |
|  | 0.077 | <0.01 | <0.01 | <0.01 | <0.01 |
|  | 0.120 | <0.01 | <0.01 | <0.01 | <0.01 |
|  | 0.225 | <0.01 | <0.01 | <0.01 | <0.01 |
|  | 0.342 | <0.01 | <0.01 | <0.01 | <0.01 |
| Transformer Oil Basestock B + 3 wt % A200 ND | 0 | 12.27 | 30.82 | 43.90 | 25.43 |
|  | 0.054 | <0.01 | <0.01 | <0.01 | <0.01 |
|  | 0.092 | <0.01 | <0.01 | <0.01 | <0.01 |
|  | 0.197 | <0.01 | <0.01 | <0.01 | <0.01 |
|  | 0.319 | <0.01 | <0.01 | <0.01 | <0.01 |

These results show that transformer oil compositions based on transformer oil basestocks according to the disclosed embodiments have an excellent oxidation stability and a very strong response to BHT. In particular, as low as about 0.05 wt % of BHT (as measured by ASTM D2668) is sufficient to obtain an oxidation stability that meets an oxidation stability requirement according to ASTM D2112 of higher than 195 minutes and an excellent oxidation stability according to ASTM D2440. Without being bound by any theory, it is believed that this strong response to BHT is driven by the relatively high paraffinic carbon content of the basestocks. These results also show that there is not much additional improvement in stability going from 0.2 wt % BHT to closer to 0.3 wt % BHT (as measured by ASTM D2668) which corresponds to the maximal specification for transformer oils. Last but not least, FIG. 1 shows that transformer oil compositions based on Basestocks A or B and containing as little as 0.1 wt % BHT have a comparable or better oxidation stability as compared to Caltran™ 60-30 product which contains 0.27 wt % BHT (as measured by ASTM D2668).

Example 4—Gassing Tendency of Transformer Oil Compositions

Figure 2:
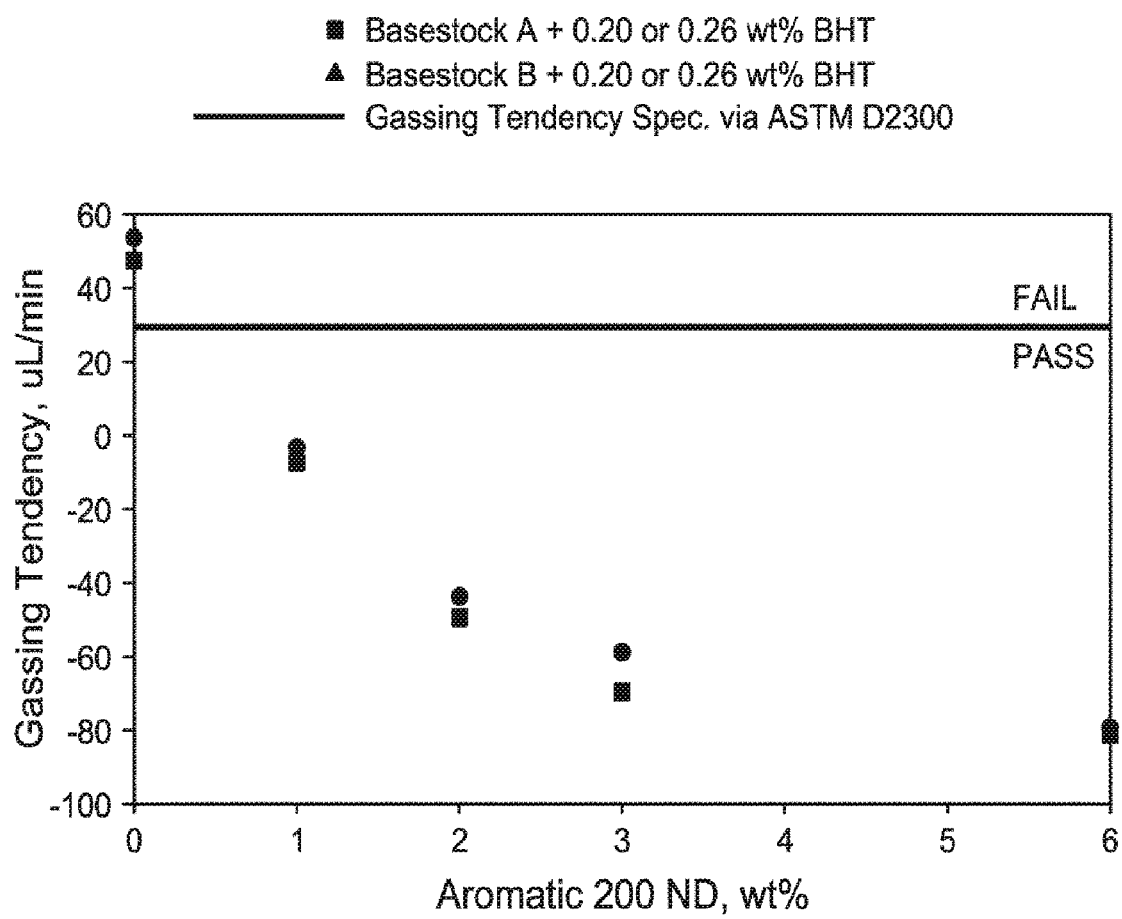
FIG. 2 shows the gassing tendency, as measured by ASTM D2300, of transformer oil compositions comprising Transformer Oil Basestock A or B, 0.20 or 0.26 wt % BHT, and 0 to 6 wt % A200 ND, based on the weight of the transformer oil composition.

FIG. 2 shows the effect of the addition of 0 to 6 wt % of A200 ND on the gassing tendency of transformer oil compositions based on Transformer Oil Basestocks A and B. Said transformer oil compositions further comprised either 0.20 wt % or 0.26 wt % BHT. These results show that the addition of as low as 1 wt % of an anti-gassing agent such as A200 ND to the transformer oil basestocks of the disclosed embodiments allows for the preparation of transformer oil compositions having a negative gassing tendency. These results also show that the use of the transformer oil basestocks of the disclosed embodiments allows for the preparation of transformer oil compositions having an especially low gassing tendency which can be as low as less than −40 μL/min. or even less than −60 μL/min. or −70 μL/min. These results are confirmed by the data provided above in Table 3, including for compositions using A200 ULN as anti-gassing agent.

Example 5—Flash Point and Pour Point of Transformer Oil Compositions

Figure 3:
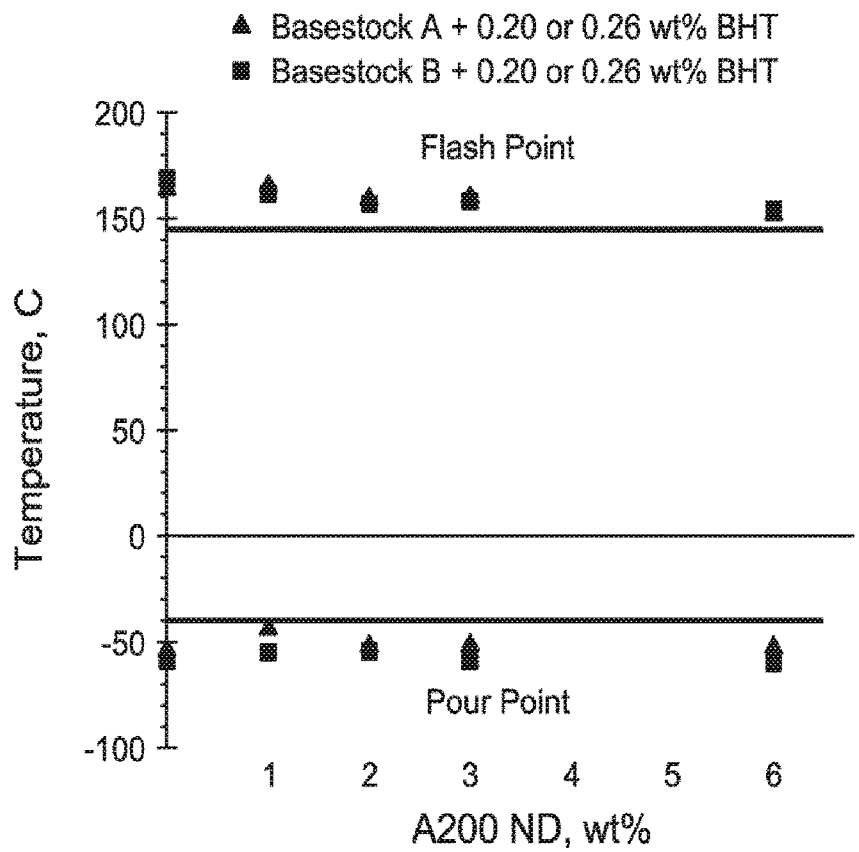
FIG. 3 shows the flash point and pour point, as measured by ASTM D92 and ASTM D97, of transformer oil compositions comprising Transformer Oil Basestock A or B, 0.20 or 0.26 wt % BHT, and 0 to 6 wt % A200 ND, based on the weight of the transformer oil composition.

FIG. 3 shows the effect of the addition of 0 to 6 wt % of A200 ND on the flash point and pour point of transformer oil compositions based on Transformer Oil Basestocks A and B. The transformer oil compositions further comprised either 0.20 wt % or 0.26 wt % BHT. These results show that the A200 ND and BHT additives have a very limited effect on the flash point and pour point of the resulting transformer oil compositions which still fulfil the requirements of transformer oil specifications. These results are confirmed by the data provided above in Table 3, including for compositions using A200 ULN as anti-gassing agent.

Figure 4:
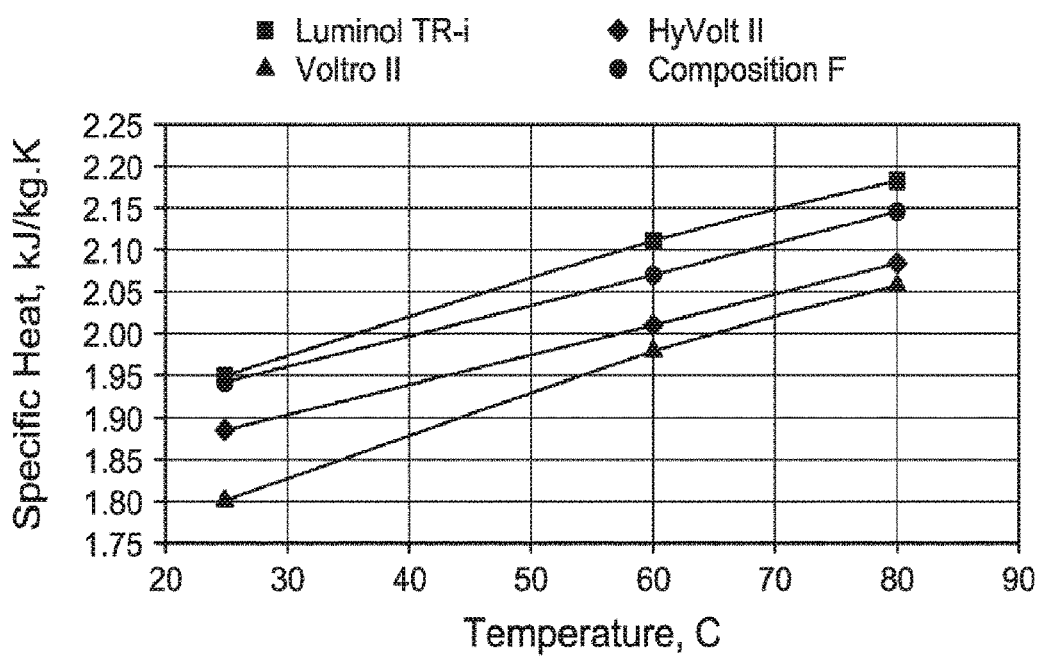
FIG. 4 shows the specific heat capacity by differential scanning calorimetry as measured by ASTM E1269 of transformer oil composition F and of three commercial transformer oil compositions.
Figure 5:
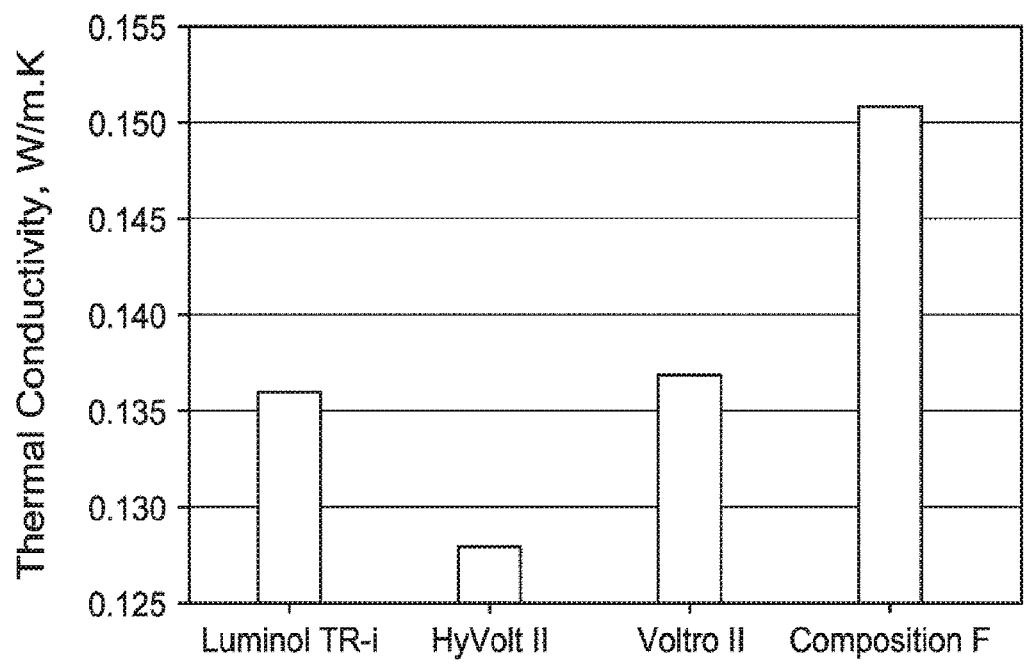
FIG. 5 shows the thermal conductivity by differential scanning calorimetry as measured by test method PLTL-73 at 80° C. of transformer oil composition F and of three commercial transformer oil compositions.
Figure 6:
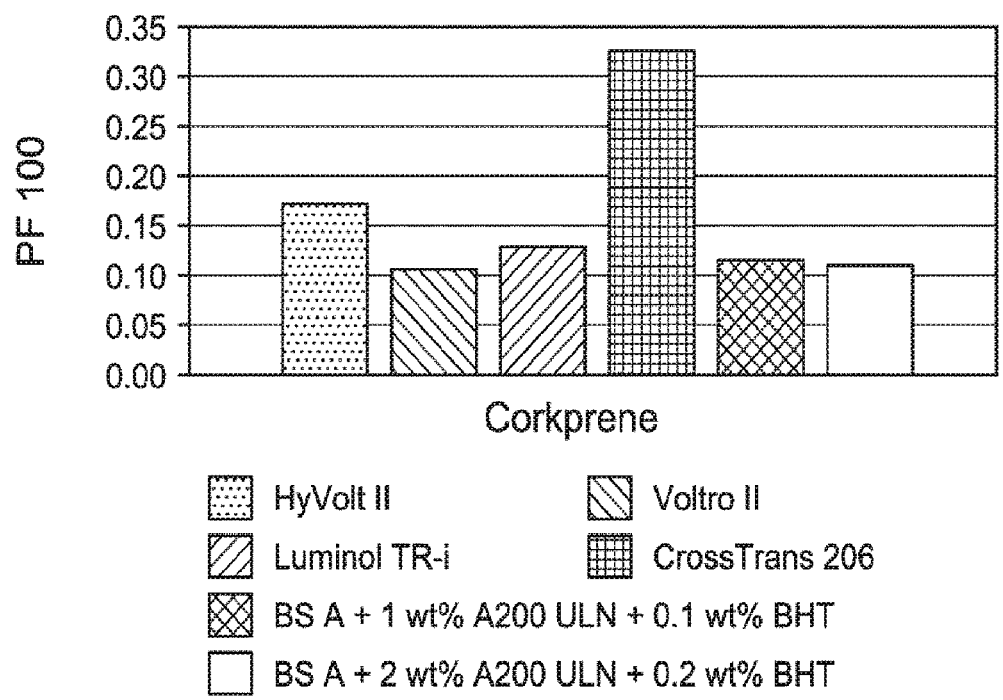
FIGS. 6 to 9 show the impact of material compatibility as measured by ASTM D3455 in terms of power factor at 100° C. (PF100) as measured by ASTM D924 after aging, of transformer oil compositions based on Transformer Oil Basestock A (BS A) comprising respectively 1.0 wt % of A200 ULN+0.1 wt % BHT and 2.0 wt % of A200 ULN+0.2 wt % BHT and of four commercial transformer oil compositions against four commonly used gasket materials.
Figure 7:
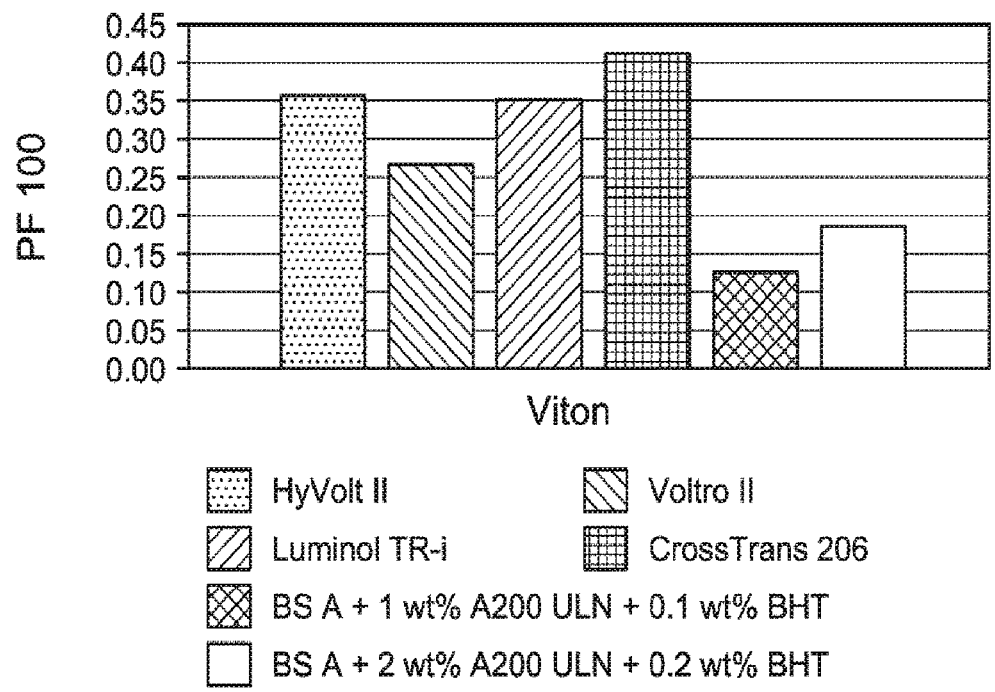
Figure 8:
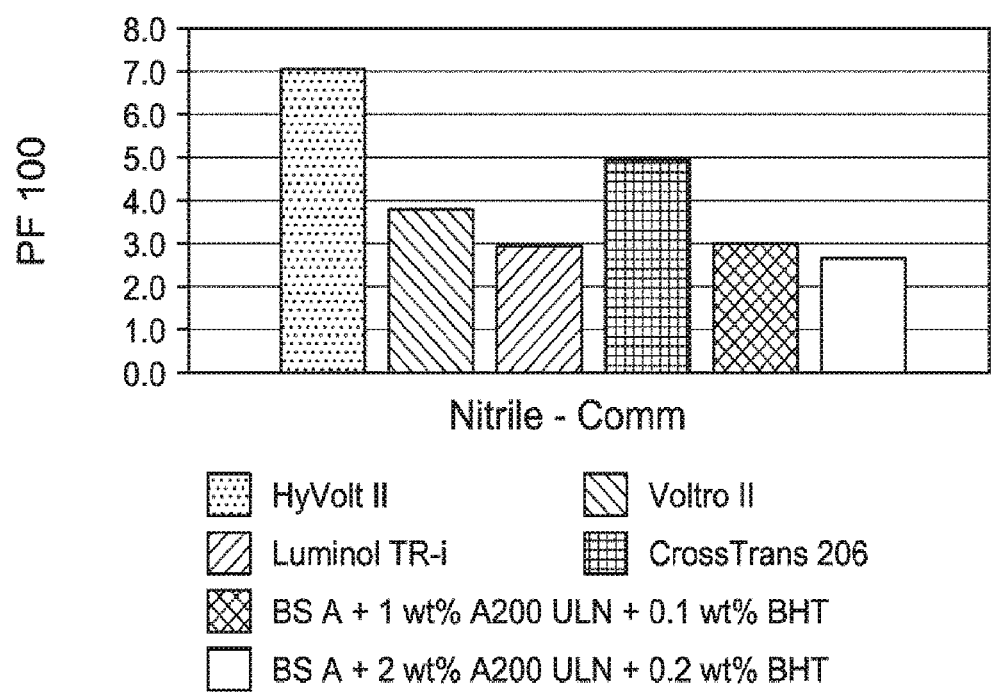
Figure 9:
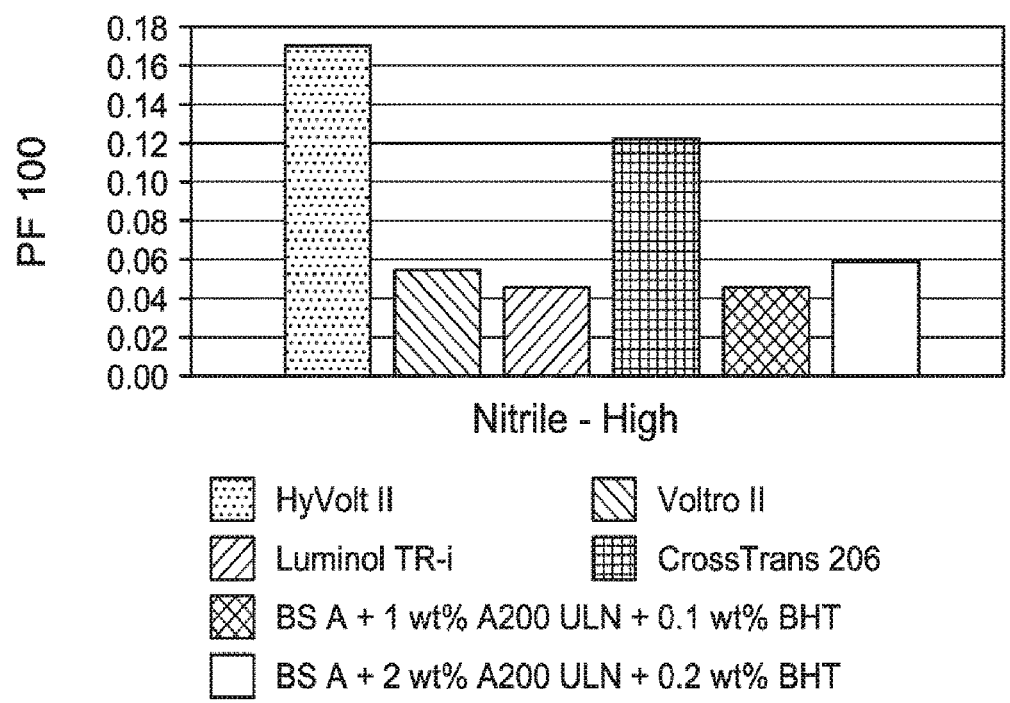

Example 6—Specific Heat and Thermal Conductivity of Transformer Oil Compositions FIGS. 4 and 5 show the specific heat capacity by differential scanning calorimetry as measured by ASTM E1269 and the thermal conductivity by differential scanning calorimetry as measured by test method PLTL-73 at 80° C. of transformer oil composition F (according to the invention) and the three following commercial transformer oil compositions:

Luminol™ TR-i oil, an inhibited (Type II) isoparaffinic transformer oil composition commercialized by Petro-Canada, HyVolt™ II oil, an inhibited (Type II) naphthenic transformer oil composition commercialized by Ergon, and Voltro™ II oil, an inhibited (Type II) naphthenic transformer oil composition commercialized by Renkert.

FIG. 4 shows that transformer oil composition F has a higher heat capacity as compared to HyVolt II oil and Voltro II oil but slightly lower than Luminol TR-i oil.

FIG. 5 shows that transformer oil composition F has a thermal conductivity that is at least 10% higher as compared to HyVolt II, Voltro II, and Luminol TR-i oils.

Example 7—Material Compatibility of Transformer Oil Compositions

The impact of material compatibility as measured by ASTM D3455 in terms of power factor at 100° C. (PF100) as measured by ASTM D924 after aging, of transformer oil compositions based on Transformer Oil Basestock A (BS A) and comprising respectively 1.0 wt % of A200 ULN+0.1 wt % BHT and 2.0 wt % of A200 ULN+0.2 wt % BHT was compared to the four following commercial transformer oil compositions: Luminol TR-i oil, HyVolt II oil, Voltro II oil, and CrossTrans™ 206 oil. CrossTrans 206 oil is an inhibited (Type II) naphthenic insulating oil commercialized by Cross Oil.

FIGS. 6 to 9 show the PF100 of the tested transformer oil compositions after aging with four commonly used gasket materials: Viton™ fluoroelastomer, Corkprene, commercial grade nitrile (Nitrile—Comm) and high grade nitrile (Nitrile—High). These results show that the transformer oil compositions of the present invention have an improved material compatibility with Viton fluoroelastomer, Corkprene and nitrile as compared to the tested naphthenic commercial oils.

It will be appreciated that various presently unforeseen or unanticipated alternatives, modifications, variations, or improvements therein may be subsequently made by those skilled in the art, and are also intended to be encompassed by the following claims.

The disclosures of the foregoing publications are hereby incorporated by reference in their entirety. The appropriate components and aspects of the foregoing publications may also be selected for the present materials and methods in embodiments thereof.

Additionally or alternately, embodiments disclosed herein relate to:

Embodiment 1: A transformer oil basestock comprising at least 99 wt % of naphthenes and paraffins, based on the total weight of the transformer oil basestock, wherein the weight ratio of naphthenes to paraffins is at least 1, as measured by GC-MS, and wherein the paraffins consist essentially of isoparaffins, as determined by GC-FID.

Embodiment 2: The transformer oil basestock of embodiment 1 comprising from 50 to 80 wt % naphthenes and from 20 to 50 wt % paraffins, preferably from 60 to 70 wt % naphthenes and from 30 to 40 wt % paraffins, based on the total weight of the transformer oil basestock, as measured by GC-MS, and no more than 1 wt % total aromatics, in particular no more than 0.6 wt % total aromatics, more particularly no more than 0.2 wt % total aromatics, based on the total weight of the transformer oil basestock, as measured by ASTM D7419; in particular wherein the weight ratio of naphthenes to paraffins is from greater than 1.0 to 4.0, especially from 1.2 to 3.0, more especially from 1.5 to 2.4.

Embodiment 3: The transformer oil basestock of embodiment 1 or 2 having a % $C_N$ of from 20 to 50%, a % $C_P$ of from 50 to 80%, and a % $C_A$ of less than 1%; preferably a % $C_N$ of from 30 to 40%, a % $C_P$ of from 60 to 70%, and a % $C_A$ of no more than 0.2%, based on the total weight of the transformer oil basestock and as measured by ASTM D2140.

Embodiment 4: The transformer oil basestock of any one of embodiments 1 to 3, having an initial boiling point (IBP) of at least 250° C., in particular at least 280° C., and a final boiling point (FBP) of at most 410° C., in particular at most 380° C., and preferably having a distillation range as defined by (FBP-IBP) of at most 100° C., especially of at least 20° C., and at most 90° C., and/or a distillation range as defined by ($T_{90}$-$T_{10}$) of at most 60° C., especially of at least 10° C., and at most 50° C., as measured by ASTM D86, and/or having an initial boiling point (IBP) of at least 190° C., in particular at least 210° C., and a final boiling point (FBP) of at most 450° C., in particular at most 430° C., and preferably having a distillation range as defined by (FBP-IBP) of at most 250° C., especially of at least 100° C., and at most 220° C., and/or a distillation range as defined by ($T_{90}$-$T_{10}$) of at most 150° C., especially of at least 30° C., and at most 100° C., as measured by ASTM D2887.

Embodiment 5: The transformer oil basestock of any one of the preceding embodiments having at least one of the following properties:

(i) a flash point of at least 145° C., preferably at least 150° C., as measured by ASTM D92, (ii) a pour point of at most −40° C., preferably at most −45° C., as measured by ASTM D97, (iii) a kinematic viscosity at 100° C. of from 1 to 3 mm$^2$/s, preferably from 1.5 to less than 3 mm$^2$/s, more preferably from 2 to less than 3 mm$^2$/s, as measured by ASTM D445, (iv) a kinematic viscosity at 40° C. of from 4 to 12 mm$^2$/s, preferably from 5 to 11 mm$^2$/s, more preferably from 6 to 10 mm$^2$/s, as measured by ASTM D445, (v) a viscosity index (VI) of at least 80, as calculated based on ASTM D2270, (vi) a specific gravity (or relative density) at 15.6° C. of at most 0.91, preferably of 0.82 to 0.86, as measured by ASTM D1298, (vii) an aniline point of at least 80° C., preferably of at least 90° C., as measured by ASTM D611.

Embodiment 6: The transformer oil basestock of embodiment 5 meeting at least two requirements of properties (i) to (vii), preferably at least three, more preferably at least four, most preferably all the requirements of properties (i) to (vii).

Embodiment 7: The transformer oil basestock of any one of the preceding embodiments, obtainable by a process comprising at least one of hydrodemetallization, hydrotreating, hydrodewaxing, hydrofinishing, and fractionation of a feedstock; preferably comprising solvent extraction, hydrodemetallization, hydrotreating, hydrodewaxing, hydrofinishing, and fractionation of a feedstock, more preferably wherein the feedstock is a vacuum gas oil feedstock, most preferably wherein the transformer oil basestock is recovered as a sidestream from the fractionation step of a process that produces Group II base oils.

Embodiment 8: A transformer oil composition comprising the transformer oil basestock of any one of the preceding embodiments, an anti-gassing agent, and an antioxidant.

Embodiment 9: The transformer oil composition of embodiment 8, having a gassing tendency at 80'C of about 0 μL/min. or less, especially less than 0 μL/min., preferably less than −30 μL/min., more preferably less than −40 μL/min., even more preferably less than −45 μL/min., most preferably less than −50 μL/min., as measured by ASTM D2300.

Embodiment 10: The transformer oil composition of embodiment 8 or 9, wherein the anti-gassing agent is an aromatic compound that comprises at least one labile hydrogen atom, preferably wherein the anti-gassing agent is selected from the group consisting of alkyl benzenes, alkyl naphthalenes, and alkyl substituted or unsubstituted, partially saturated polyring aromatics; in particular from the group consisting of Aromatic 200 fluid (A200), Naphthalene Depleted Aromatic 200 fluid (A200 ND), Ultra Low Naphthalene Aromatic 200 fluid (A200 ULN), Solvesso 200 fluid (SV200), and Naphthalene Depleted Solvesso 200 fluid (SV200 ND), more particularly from A200 ND, SV200 ND, and A200 ULN.

Embodiment 11: The transformer oil composition of any one of embodiments 8 to 10, wherein the anti-gassing agent is added in an amount of at most 6 wt %, preferably at most 3 wt %, especially 0.5 to 3 wt %, such as 1.0 to 2.0 wt %, by weight of the transformer oil composition.

Embodiment 12: The transformer oil composition of any one of embodiments 8 to 11, wherein the antioxidant is selected from the group consisting of hindered phenols, cinnamate type phenolic esters, alkylated diphenylamines, and combinations thereof; preferably a hindered phenol antioxidant; more preferably butylated hydroxytoluene (BHT).

Embodiment 13: The transformer oil composition of any one of embodiments 8 to 12, further comprising at least one additive selected from the group consisting of pour point depressants, metal deactivators, metal passivators, antifoaming agents, markers, biocides, antistatic additives, and combinations thereof.

Embodiment 14: The transformer oil composition of any one of embodiments 8 to 13, comprising no pour point depressant.

Embodiment 15: The transformer oil composition of any one of embodiments 8 to 14, having at least one of the following properties:

(i) a flash point of at least 145° C., preferably at least 150° C., as measured by ASTM D92, (ii) a pour point of at most −40° C., preferably at most −42° C., as measured by ASTM D97, (iii) a kinematic viscosity at 100° C. of from 1 to 3 mm$^2$/s, preferably from 1.5 to less than 3 mm$^2$/s, more preferably from 2 to less than 3 mm$^2$/s, as measured by ASTM D445, (iv) a kinematic viscosity at 40° C. of from 4 to 12 mm$^2$/s, preferably from 5 to less than 10 mm$^2$/s, more preferably from 6 to 9 mm$^2$/s, as measured by ASTM D445, (v) a kinematic viscosity at 0° C. of from 10 to 76 mm$^2$/s, preferably from 20 to 60 mm$^2$/s, more preferably from 30 to 55 mm$^2$/s, as measured by ASTM D445, (vi) a kinematic viscosity at −30° C. of from 200 to 500 mm$^2$/s, preferably from 300 to 400 mm$^2$/s, as measured by ASTM D445, (vii) a kinematic viscosity at −40° C. of from 500 to 3,000 mm$^2$/s, preferably from 1,000 to 2,000 mm$^2$/s, as measured by ASTM D445, (viii) a specific gravity at 15.6° C. of at most 0.91, preferably of 0.83 to 0.86, as measured by ASTM D1298, (ix) an aniline point of at least 80° C., preferably of at least 85° C., as measured by ASTM D611, (x) an oxidation stability of at most 0.1 wt % of sludge after 72 hours, preferably <0.01 wt % of sludge, as measured by ASTM D2440, (xi) an oxidation stability of at most 0.2 w % of sludge after 164 hours, preferably <0.01 wt % of sludge, as measured by ASTM D2440, (xii) an oxidation stability of at least 300 minutes, preferably at least 400 minutes, as measured by ASTM D2112.

Embodiment 16: Use of the transformer oil basestock of any one of embodiments 1 to 7 for preparing a transformer oil composition having an improved gassing tendency and/or an improved oxidation stability.

Embodiment 17: The use of embodiment 16 for preparing a transformer oil composition having a gassing tendency of about 0 μL/min. or less, especially less than 0 μL/min., preferably less than −30 μL/min., more preferably less than −40 μL/min., even more preferably less than −45 μL/min., most preferably less than −50 μL/min., as measured by ASTM D2300.

Embodiment 18: The use of embodiment 16 or 17 for preparing a transformer oil composition according to any one of embodiments 8 to 15.

Embodiment 19: The use of any one of embodiments 16 to 18 wherein the transformer oil basestock of any one of embodiments 1 to 7 is combined with an anti-gassing agent selected from the group consisting of alkyl benzenes, alkyl naphthalenes, and alkyl substituted or unsubstituted, partially saturated polyring aromatics; in particular from the group consisting of Aromatic 200 fluid (A200), Naphthalene Depleted Aromatic 200 fluid (A200 ND), Ultra Low Naphthalene Aromatic 200 fluid (A200 ULN), Solvesso 200 fluid (SV200), and Naphthalene Depleted Solvesso 200 fluid (SV200 ND); more particularly from A200 ND, SV200 ND and A200 ULN.

Embodiment 20: Use of the basestock of any one of embodiments 1 to 7 in end-uses selected from the group consisting of AgChem (e.g. agricultural spray oils), high viscosity low pour point base oils for drilling muds, silicone oil extenders, acrylic and silicone mastics and sealants, adhesives, explosive formulations, printing inks (e.g. printing ink distillates for off-set printing, piezo ink jet technology, cold-set printing, and heat-set printing), diluent oils for lube additives, spindle oils, coolants (e.g. battery coolants, coolants for data storage, process coolant fluids), heat transfer fluids, electric vehicle fluids (e.g. coolant or heat transfer fluid for batteries, motors and/or electrical components), metal working fluids, plasticizers, mold oils, coning oils, dust control fluids, collector fluids in floatation processes such as mining floatation, mining extraction, metal extraction, process fluids, hydraulic oils, animal vaccines, paints and coatings, industrial and institutional cleaners, consumer products, lubricants, automotive lubricants, and transmission fluids.

The invention claimed is:

1. A transformer oil composition, comprising:
    a basestock comprising at least 99 wt % of naphthenes and isoparaffins as determined by GC-FID, and less than or equal to 1 wt % total aromatics, as measured by ASTM D7419, based on the total weight of the transformer oil basestock, wherein:
        the weight ratio of the naphthenes to the isoparaffins is from 1.2 to 4.0, as measured by GC-MS,
        the basestock has a viscosity index (VI) of 80-100, as calculated based on ASTM D2270;
        the basestock has an initial boiling point (IBP) of at least 280° C. and a final boiling point (FBP) of at most 380° C.,
        the basestock has a distillation range as defined by (FBP-IBP) of at most 100° C., a distillation range as defined by (T90–T10) of at most 60° C., as measured by ASTM D86; and
        the basestock has a flash point of at least 145° C., as measured by ASTM D92;
    an anti-gassing agent; and
    an antioxidant.

2. The transformer oil composition of claim 1, wherein the basestock comprises 54.5 to 80 wt % naphthenes and from 20 to 45.5 wt % isoparaffins, based on the total weight of the transformer oil basestock, as measured by GC-MS.

3. The transformer oil composition of claim 1, wherein the basestock comprises a % $C_N$ of from 20 to 50%, a % $C_P$ of from 50 to 80%, and a % $C_A$ of less than 1%, based on the total weight of the transformer oil basestock and as measured by ASTM D2140.

4. The transformer oil composition of claim 1, further having at least one of the following properties:
    a pour point of at most −40° C., as measured by ASTM D97;
    a kinematic viscosity at 100° C. of from 1 to 3 mm²/s, as measured by ASTM D445;
    a kinematic viscosity at 40° C. of from 4 to 12 mm²/s, as measured by ASTM D445;
    a specific gravity (or relative density) at 15.6° C. of at most 0.91, as measured by ASTM D1298; and
    an aniline point of at least 80° C., as measured by ASTM D611.

5. The transformer oil composition of claim 1, wherein the transformer oil basestock is derived by one or more processes selected from the group consisting of hydrodemetallization, hydrotreating, hydrodewaxing, hydrofinishing, and fractionation of a vacuum gas oil feedstock.

6. The transformer oil composition of claim 1, further comprising a gassing tendency at 80° C. of less than −40 μL/min., as measured by ASTM D2300.

7. The transformer oil composition of claim 1, wherein the anti-gassing agent is selected from the group consisting of alkyl benzenes, alkyl naphthalenes, and alkyl substituted or unsubstituted, partially saturated polyring aromatics.

8. The transformer oil composition of claim 1, wherein the anti-gassing agent comprises at most 6 wt %, by weight of the transformer oil composition.

9. The transformer oil composition of claim 1, wherein the antioxidant is selected from the group consisting of hindered phenols, cinnamate type phenolic esters, alkylated diphenylamines, and combinations thereof.

10. The transformer oil composition of claim 1, further comprising at least one additive selected from the group consisting of pour point depressants, metal deactivators, metal passivators, anti-foaming agents, markers, biocides, antistatic additives, and combinations thereof.

11. The transformer oil composition of claim 1, having at least two of the following properties:
    (i) a flash point of at least 145° C., as measured by ASTM D92;
    (ii) a pour point of at most −40° C., as measured by ASTM D97;
    (iii) a kinematic viscosity at 100° C. of from 1 to 3 mm²/s, as measured by ASTM D445;
    (iv) a kinematic viscosity at 40° C. of from 4 to 12 mm²/s, as measured by ASTM D445;
    (v) a kinematic viscosity at 0° C. of from 10 to 76 mm²/s, as measured by ASTM D445;
    (vi) a kinematic viscosity at −30° C. of from 200 to 500 mm²/s, as measured by ASTM D445;
    (vii) a kinematic viscosity at −40° C. of from 500 to 3,000 mm²/s, as measured by ASTM D445;
    (viii) a specific gravity at 15.6° C. of at most 0.91, as measured by ASTM D1298;
    (ix) an aniline point of at least 80° C., as measured by ASTM D611;
    (x) an oxidation stability of at most 0.1 wt % of sludge after 72 h, as measured by ASTM D2440;
    (xi) an oxidation stability of at most 0.2 wt % of sludge after 164 h, as measured by ASTM D2440; and
    (xii) an oxidation stability of at least 300 minutes, as measured by ASTM D2112.

12. A method of preparing a transformer oil composition according to claim 6, the method comprising:
    combining a transformer oil basestock according to claim 2, an anti-gassing agent, and an antioxidant.

13. The method of claim 12, wherein the anti-gassing agent is selected from the group consisting of alkyl benzenes, alkyl naphthalenes, and alkyl substituted or unsubstituted, partially saturated polyring aromatics.

14. The method of claim 12, wherein the antioxidant is selected from the group consisting of hindered phenols, cinnamate type phenolic esters, alkylated diphenylamines, and combinations thereof.

15. A transformer oil composition of claim 1, comprising an alkylated polystyrene pour point depressant.

16. A transformer oil composition, comprising:
- a basestock consisting essentially of naphthenes and isoparaffins, wherein a weight ratio of the naphthenes to the isoparaffins is from 1.2 to 4.0, as measured by GC-MS;
- an anti-gassing agent; and
- an antioxidant, wherein the composition has:
  - a viscosity index (VI) of 80 to 100, as calculated based on ASTM D2270;
  - a pour point of at most −40° C., as measured by ASTM D97;
  - a kinematic viscosity at 100° C. of from 2 to 3 mm$^2$/s, as measured by ASTM D445; and
  - a kinematic viscosity at −30° C. of from 200 to 500 mm$^2$/s, as measured by ASTM D445.

17. The transformer oil basestock of claim 16, further comprising less than 1 wt % total aromatics, based on the total weight of the transformer oil basestock, as measured by ASTM D7419.

18. The transformer oil basestock of claim 16, wherein the basestock has a specific gravity at 15.6° C. of at most 0.91, as measured by ASTM D1298.

19. The transformer oil basestock of claim 18, further comprising less than 0.2 wt % total aromatics, based on the total weight of the transformer oil basestock, as measured by ASTM D7419.

20. A transformer oil composition, comprising:
- a basestock derived by fractionation of a vacuum gas oil feedstock, wherein the basestock consists essentially of at least 99 wt % of naphthenes and isoparaffins as determined by GC-FID, and less than or equal to 1 wt % total aromatics, as measured by ASTM D7419, based on the total weight of the basestock, wherein:
  - the weight ratio of the naphthenes to the isoparaffins is from 1.2 to 4.0, as measured by GC-MS,
  - the basestock has a viscosity index (VI) of 80-100, as calculated based on ASTM D2270;
  - the basestock has an initial boiling point (IBP) of at least 280° C. and a final boiling point (FBP) of at most 380° C.,
  - the basestock has a distillation range as defined by (FBP-IBP) of at most 100° C., a distillation range as defined by (T90–T10) of at most 60° C., as measured by ASTM D86; and
  - the basestock has a flash point of at least 145° C., as measured by ASTM D92;
- an anti-gassing agent; and
- an antioxidant, wherein the transformer oil composition has two or more of the following properties: a pour point of at most −40° C., as measured by ASTM D97; a kinematic viscosity at 100° C. of from 1 to 3 mm$^2$/s, as measured by ASTM D445; a kinematic viscosity at 40° C. of from 4 to 12 mm$^2$/s, as measured by ASTM D445; a specific gravity at 15.6° C. of at most 0.91, as measured by ASTM D1298; and an aniline point of at least 80° C., as measured by ASTM D611.

\* \* \* \* \*